(12) United States Patent
Seledkin et al.

(10) Patent No.: US 12,608,414 B2
(45) Date of Patent: Apr. 21, 2026

(54) RECURSIVE AGGLOMERATIVE CLUSTERING OF TIME-STRUCTURED COMMUNICATIONS

(71) Applicant: Visier Solutions Inc., Vancouver (CA)

(72) Inventors: Viacheslav Seledkin, Moscow (RU); David Yan, Portola Valley, CA (US); Marina Chilingaryan, Menlo Park, CA (US)

(73) Assignee: Visier Solutions Inc., Vancouver (CA)

( * ) Notice: Subject to any disclaimer, the term of this patent is extended or adjusted under 35 U.S.C. 154(b) by 273 days.

(21) Appl. No.: 17/950,067

(22) Filed: Sep. 21, 2022

(65) Prior Publication Data

US 2023/0078263 A1      Mar. 16, 2023

Related U.S. Application Data

(60) Continuation-in-part of application No. 17/384,972, filed on Jul. 26, 2021, now abandoned, which is a (Continued)

(51) Int. Cl.
G06F 16/358 (2025.01)
G06F 16/334 (2025.01)
G06F 16/93 (2019.01)

(52) U.S. Cl.
CPC ........ G06F 16/358 (2019.01); G06F 16/3347 (2019.01); G06F 16/93 (2019.01)

(58) Field of Classification Search
CPC .... G06F 16/93; G06F 16/3347; G06F 16/906; G06F 16/358

(Continued)

(56) References Cited

U.S. PATENT DOCUMENTS 6,185,551 B1 * 2/2001 Birrell .................. G06Q 10/107
                                          707/999.102
6,442,545 B1 * 8/2002 Feldman ............... G06F 16/355
                    (Continued)

FOREIGN PATENT DOCUMENTS

EP       2682052 A2    1/2014
JP       5688754 B2    2/2015
                (Continued)

OTHER PUBLICATIONS

Ankerst, M., Breunig, M. M., Kriegel, H. P., & Sander, J. (Jun. 1999). OPTICS: ordering points to identify the :Austering structure. In ACM Sigmod record (vol. 28, No. 2, pp. 49-60). ACM.

(Continued)

*Primary Examiner* — Giovanna B Colan
(74) *Attorney, Agent, or Firm* — Morgan, Lewis & Bockius LLP

(57) ABSTRACT

An example method of document cluster labeling comprises: selecting a current document cluster of a plurality of document clusters (e.g., the current document cluster can have documents organized using a DBSCAN or OPTICS algorithm); initializing a label associated with the current document cluster; selecting a term from a list of terms comprised by the document cluster; appending the term to the label associated with the current document cluster; responsive to determining that the label is found in a label dictionary, iteratively selecting a next term from the list of terms comprised by the document cluster and appending the next term to the label associated with the current document cluster; responsive to failing to locate the label in the label dictionary, inserting the label into the label dictionary; and associating the label with the current document cluster.

22 Claims, 11 Drawing Sheets

Related U.S. Application Data division of application No. 15/972,952, filed on May 7, 2018, now Pat. No. 11,074,285, application No. 17/950,067, filed on Sep. 21, 2022 is a continuation-in-part of application No. 16/902,937, filed on Jun. 16, 2020, now Pat. No. 11,574,069, and a continuation-in-part of application No. 16/030,598, filed on Jul. 9, 2018, now abandoned.

(60) Provisional application No. 62/504,390, filed on May 10, 2017, provisional application No. 62/863,031, filed on Jun. 18, 2019, provisional application No. 62/530,798, filed on Jul. 10, 2017, provisional application No. 62/552,625, filed on Aug. 31, 2017.

(58) Field of Classification Search
USPC ........................................................ 707/737
See application file for complete search history.

(56) References Cited

U.S. PATENT DOCUMENTS

| | | | | |
|---|---|---|---|---|
| 7,117,432 | B1 * | 10/2006 | Shanahan | G06F 16/353 |
| | | | | 715/236 |
| 8,095,411 | B2 | 1/2012 | Beringer et al. | |
| 8,583,747 | B2 * | 11/2013 | Buchheit | G06Q 10/107 |
| | | | | 707/711 |
| 9,002,848 | B1 * | 4/2015 | Peng | G06F 16/355 |
| | | | | 707/738 |
| 9,319,367 | B2 | 4/2016 | Zeng et al. | |
| 9,356,790 | B2 | 5/2016 | Zambetti et al. | |
| 9,620,108 | B2 | 4/2017 | Sak et al. | |
| 10,083,176 | B1 | 9/2018 | Desai et al. | |
| 10,356,243 | B2 | 7/2019 | Sanghavi et al. | |
| 10,361,981 | B2 | 7/2019 | Bennett et al. | |
| 2003/0061200 | A1 * | 3/2003 | Hubert | G06F 16/38 |
| 2007/0198977 | A1 | 8/2007 | Abernethy et al. | |
| 2010/0107165 | A1 | 4/2010 | Koskimies et al. | |
| 2010/0174670 | A1 * | 7/2010 | Malik | G06F 18/231 |
| | | | | 706/12 |
| 2011/0087668 | A1 | 4/2011 | Thomas et al. | |
| 2011/0093464 | A1 | 4/2011 | Cvet et al. | |
| 2011/0145823 | A1 | 6/2011 | Rowe et al. | |
| 2012/0239650 | A1 * | 9/2012 | Kim | G06F 40/30 |
| | | | | 707/E17.089 |
| 2013/0060772 | A1 | 3/2013 | Clark et al. | |
| 2014/0015855 | A1 * | 1/2014 | Denney | G09G 5/14 |
| | | | | 345/629 |
| 2014/0037214 | A1 | 2/2014 | Deolalikar et al. | |

| | | | |
|---|---|---|---|
| 2014/0164036 | A1 | 6/2014 | Prieto |
| 2015/0039705 | A1 | 2/2015 | Kursun |
| 2015/0120680 | A1 | 4/2015 | Alonso et al. |
| 2016/0012058 | A1 | 1/2016 | Franceschini et al. |
| 2016/0103885 | A1 * | 4/2016 | Lee .................. G06F 16/2465 |
| | | | 707/750 |
| 2016/0182417 | A1 | 6/2016 | Cordes et al. |
| 2016/0247110 | A1 | 8/2016 | Sinha |
| 2016/0315900 | A1 | 10/2016 | Rowny et al. |
| 2016/0323138 | A1 | 11/2016 | Wun et al. |
| 2016/0335572 | A1 | 11/2016 | Bennett et al. |
| 2017/0093615 | A1 | 3/2017 | Chandrashekar et al. |
| 2017/0132019 | A1 | 5/2017 | Karashchuk et al. |
| 2017/0161692 | A1 | 6/2017 | Miller et al. |
| 2017/0178056 | A1 | 6/2017 | Huo et al. |
| 2018/0005289 | A1 | 1/2018 | Angell et al. |
| 2018/0024968 | A1 | 1/2018 | Clinchant et al. |
| 2018/0097753 | A1 | 4/2018 | Gill et al. |
| 2018/0114198 | A1 | 4/2018 | Ghotbi et al. |
| 2018/0152407 | A1 | 5/2018 | Oni |
| 2018/0276294 | A1 | 9/2018 | Takemoto |
| 2019/0012629 | A1 | 1/2019 | Yan |
| 2019/0014070 | A1 | 1/2019 | Mertvetsov et al. |

FOREIGN PATENT DOCUMENTS

| | | | |
|---|---|---|---|
| NO | 2015/136120 | 9/2015 | |
| WO | WO-2005045564 A2 * | 5/2005 | ....... G06F 16/90344 |
| WO | WO2016/186834 A1 | 11/2016 | |
| WO | WO2017/112914 A2 | 6/2017 | |

OTHER PUBLICATIONS

Ester, M., Kriegel, H. P., Sander, J., & Xu, X. (Aug. 1996). A density-based algorithm for discovering clusters in arge spatial databases with noise. In Kdd (vol. 96, No. 34, pp. 226-231).

Smiti, Abir and Elouedi, Zied, CINTI 2015, 16th IEEE International Symposium on Computational Intelligence and Informatics, "Dynamic DBSCAN-GM Clustering Algorithm", Nov. 19-21, 2015, 6 pages.

Salton, G., Wong, A., & Yang, C. S. (1975). A vector space model for automatic indexing. Communications of the ACM, 18(11), 613-620.

Uora, "What is max pooling in convolutional neural networks?" ttps://www.guora.com/What-is-max-pooling-in-convolutional-neural-networks, 6 pages, [retrieved from Internet: Aug. 2, 2021].

Yianilos, P. N. (Jan. 1993). Data structures and algorithms for nearest neighbor search in general metric spaces. n SODA (vol. 93, No. 194, pp. 311-321).

* cited by examiner

600

610 Receive unlabeled text corpus

620 Receive labeled text corpus

630 Train autoencoder

640 Destroy decoder

650 Adjust noise amplitude parameter based on labeled text corpus

660 Utilize encoder and noise amplitude parameter for text anonymization

810 Receive natural language text

820 Transform natural language text by neural network to numeric representation

830 Apply distorting transformation to numeric representation

840 Discard natural language text

850 Perform information extraction task

1000

Internet

Messaging 1030

Network 1020

Information extraction 1010

Performance evaluation 1040

Data store 1050

Directory 1060

Presentation 1070

Client 1080

1100

1110 Analyze documents to identify tasks assigned to person

1120 Identify subset of documents associated with each task

1130 Analyze subset of documents to extract performance parameters

1140 Determine value of performance metric

1150
| Value – Ref. value | >> T?

1160 Generate alert

RECURSIVE AGGLOMERATIVE CLUSTERING OF TIME-STRUCTURED COMMUNICATIONS

REFERENCE TO RELATED APPLICATIONS

The Present Application is a continuation-in-part of (1) U.S. patent application Ser. No. 17/384,972 (filed Jul. 26, 2021), which is a division of U.S. patent application Ser. No. 15/972,952 (filed May 7, 2018) (issued as U.S. Pat. No. 11,074,285), which claims priority from U.S. Patent App. No. 62/504,390 (filed May 10, 2017); (2) U.S. patent application Ser. No. 16/902,937 (filed Jun. 16, 2020), which claims priority from U.S. Patent App. No. 62/863,031 (filed Jun. 18, 2019); and (3) U.S. patent application Ser. No. 16/030,598 (filed Jul. 9, 2018), which claims priority from U.S. Patent App. No. 62/530,798 (filed Jul. 10, 2017) and U.S. Patent App. No. 62/552,625 (filed Aug. 31, 2017). The Present Application incorporates by reference the entire contents of each of the aforenoted applications.

TECHNICAL FIELD

The present disclosure relates generally to processing structured communications in computer systems, and, in particular, recursive agglomerative clustering of time-structured communications and also presenting, via a graphical user interface, one or more clusters of a plurality of document clusters in a visual association with respective labels determined based on the recursive agglomerative clustering.

BACKGROUND

In the digital age, users of electronic communication systems, such as electronic mail and other messaging systems, are forced to deal with unprecedentedly large volumes of information; this volume of information grows exponentially through the increasing number of files, contacts, documents, and other types of data communicated between the users on a daily basis. This dramatic increase can be explained by a number of reasons. The number of various activities and projects that the users are involved in keeps growing; on the other hand, electronic communication solutions at the users' disposition have expanded, ranging from electronic mail and messengers to integrated business communication platforms, while the amount of data sources grows in proportion with the number of the technological and software advancements.

SUMMARY (A1) In some embodiments, an example method of document cluster labeling includes selecting, by a processing device, a current document cluster of a plurality of document clusters. The method also includes initializing a label associated with the current document cluster. Additionally, the method includes selecting a term from a list of terms comprised by the document cluster. Further, the method includes appending the term to the label associated with the current document cluster. Moreover, the method includes responsive to determining that the label is found in a label dictionary, iteratively selecting a next term from the list of terms comprised by the document cluster and appending the next term to the label associated with the current document cluster. Also, the method includes inserting the label into the label dictionary responsive to failing to locate the label in the label dictionary. Furthermore, the method includes associating the label with the current document cluster.

(A2) In some embodiments of the method of A1, the method further includes sorting the plurality of document clusters by a number of documents comprised by a respective document cluster.

(A3) In some embodiments of the method of A1, the method further includes sorting the list of terms by a respective term weight.

(A4) In some embodiments of the method of A1, the method further includes excluding, from the list of terms, a term comprising at least part of an entity name (A5) In some embodiments of the method of A1, the method further includes visually representing, via a graphical user interface, one or more clusters of the plurality of document clusters in a visual association with respective labels.

(A6) In some embodiments of the method of A1, the plurality of document clusters includes a plurality of electronic mail messages.

(A7) In some embodiments of the method of A1, the plurality of document clusters includes a plurality of documents represented by respective vectors in a hyperspace of document features.

(A8) In another aspect, a system includes a memory and a processor coupled to the memory. The processor is configured to select a current document cluster of a plurality of document clusters. The processor is also configured to initialize a label associated with the current document cluster. Additionally, the processor is configured to select a term from a list of terms comprised by the document cluster. Further, the processor is configured to append the term to the label associated with the current document cluster. Moreover, the processor is configured to, responsive to determining that the label is found in a label dictionary, iteratively select a next term from the list of terms comprised by the document cluster and appending the next term to the label associated with the current document cluster. Also, the processor is configured to responsive to failing to locate the label in the label dictionary, insert the label into the label dictionary. Furthermore, the processor is configured to associate the label with the current document cluster.

(A9) In some embodiments of the system of A8, the processor is further configured to sort the plurality of document clusters by a number of documents comprised by a respective document cluster.

(A10) In some embodiments of the system of A8, the processor is further configured to sort the list of terms by a respective term weight.

(A11) In some embodiments of the system of A8, exclude, from the list of terms, a term comprising at least part of an entity name.

(A12) In some embodiments of the system of A8, the processor is further configured to visually represent, via a graphical user interface, one or more clusters of the plurality of document clusters in a visual association with respective labels.

(A13) In some embodiments of the system of A8, the plurality of document clusters includes a plurality of electronic mail messages.

(A14) In some embodiments of the system of A8, the plurality of document clusters includes a plurality of documents represented by respective vectors in a hyperspace of document features.

(A15) In yet another aspect, a non-transitory, computer-readable storage medium includes executable instructions that, when executed by a computer system, cause the computer system to select a current document cluster of a plurality of document clusters. The executable instructions also cause the computer system to initialize a label associated with the current document cluster. Additionally, the executable instructions cause the computer system to select a term from a list of terms comprised by the document cluster. Further, the executable instructions cause the computer system to append the term to the label associated with the current document cluster. Moreover, the executable instructions cause the computer system to, responsive to determining that the label is found in a label dictionary, iteratively select a next term from the list of terms comprised by the document cluster and appending the next term to the label associated with the current document cluster. Also, the executable instructions cause the computer system to, responsive to failing to locate the label in the label dictionary, insert the label into the label dictionary. Furthermore, the executable instructions cause the computer system to associate the label with the current document cluster.

(A16) In some embodiments of the non-transitory, computer-readable medium of A15, the non-transitory, computer-readable medium includes further instructions that, when executed by the computer system, cause the computer system to sort the plurality of document clusters by a number of documents comprised by a respective document cluster.

(A17) In some embodiments of the non-transitory, computer-readable medium of A15, the non-transitory, computer-readable medium includes further instructions that, when executed by the computer system, cause the computer system to sort the list of terms by a respective term weight.

(A18) In some embodiments of the non-transitory, computer-readable medium of A15, the non-transitory, computer-readable medium includes further instructions that, when executed by the computer system, cause the computer system to exclude, from the list of terms, a term comprising at least part of an entity name.

(A19) In some embodiments of the non-transitory, computer-readable medium of A15, the non-transitory, computer-readable medium includes further instructions that, when executed by the computer system, cause the computer system to visually represent, via a graphical user interface, one or more clusters of the plurality of document clusters in a visual association with respective labels.

(A20) In some embodiments of the non-transitory, computer-readable medium of A15, the non-transitory, the plurality of document clusters includes a plurality of electronic mail messages.

(B1) In some embodiments, an example method includes receiving, by a computer system, a natural language text. The method also includes producing, by a neural network, a numeric representation of the natural language text. Additionally, the method includes discarding the natural language text. Further, the method includes performing, using the numeric representation of the natural language text, an information extraction task.

(B2) In some embodiments of the method of B1, the neural network is an encoder part of an autoencoder.

(B3) In some embodiments of the method of B1, producing the numeric representation of the natural language text further includes applying an irreversible distorting transformation to the numeric representation of the natural language text.

(B4) In some embodiments of the method of B3, applying to the numeric representation of the natural language text the irreversible distorting transformation further includes adding, to each element of the numeric representation, a sample of a specified statistical distribution.

(B5) In some embodiments of the method of B1, performing the information extraction task includes associating the natural language text with a category of a predefined set of categories.

(B6) In some embodiments of the method of B1, performing the information extraction task includes evaluating a process characterized by the natural language text.

(B7) In some embodiments of the method of B1, performing the information extraction task includes evaluating a likelihood of occurrence of a specified event or condition.

(B8) In some embodiments of the method of B1, performing the information extraction task includes evaluating an emotional aspect of the natural language text.

(B9) In some embodiments of the method of B1, performing the information extraction task includes feeding the numeric representation of the natural language text to a neural network that produces a numeric value indicative of a characteristic of the natural language text.

(B10) In another aspect, a system includes a memory and a processor coupled to the memory. The processor is configured to receive a natural language text. The processor is also configured to transform, by a neural network, the natural language text into a numeric representation. Additionally, the processor is configured to discard the natural language text. Further, the processor is configured to perform, using the numeric representation of the natural language text, an information extraction task.

(B11) In some embodiments of the system of B10, the neural network is part of an autoencoder.

(B12) In some embodiments of the system of B10, the processor is further configured to apply, to the numeric representation of the natural language text, an irreversible distorting transformation.

(B13) In some embodiments of the system of B10, performing the information extraction task includes associating the natural language text with a category of a predefined set of categories.

(B14) In some embodiments of the system of B10, performing the information extraction task includes evaluating a process characterized by the natural language text.

(B15) In some embodiments of the system of B10, performing the information extraction task includes evaluating a likelihood of occurrence of a specified event or condition.

(B16) In some embodiments of the system of B10, performing the information extraction task comprises evaluating an emotional aspect of the natural language text.

(B17) In yet another aspect, a non-transitory, computer-readable storage medium includes executable instructions that, when executed by a computer system, cause the computer system to receive a natural language text. The executable instructions also cause the computer system to transform, by neural network, the natural language text into a numeric representation. Additionally, the executable instructions cause the computer system to discard the natural language text. Further, the executable instructions cause the computer system to perform, using the numeric representation of the natural language text, an information extraction task.

(B18) In some embodiments of the non-transitory, computer-readable medium of B17, the neural network is an encoder part of an autoencoder.

(B19) In some embodiments of the non-transitory, computer-readable medium of B17, the non-transitory, computer-readable medium further includes instructions that cause the computer system to apply, to the numeric representation of the natural language text, an irreversible distorting transformation.

(B20) In some embodiments of the non-transitory, computer-readable medium of B17, performing the information extraction task includes feeding the numeric representation of the natural language text to a neural network that produces a numeric value indicative of a characteristic of the natural language text.

(C1) In some embodiments, an example method of evaluating performance of a person includes processing, by a computer system, a plurality of documents which record communications of a person to identify a task assigned to the person. The method also includes identifying a subset of the plurality of documents, wherein the subset of documents is associated with the task. Additionally, the method includes analyzing the subset of documents to identify a completion status of the task. Further, the method includes determining a value of a performance metric associated with the person, wherein the value of the performance metric reflects the completion status of the task.

(C2) In some embodiments of the method of C1, analyzing the subset of documents further includes determining a level of sentiments associated with the task, and wherein the performance metric further reflects the level of sentiments.

(C3) In some embodiments of the method of C1, analyzing the subset of documents further includes determining a number of tasks of a given category completed by the person within a specified period of time, and wherein the performance metric further reflects the number of tasks.

(C4) In some embodiments of the method of C1, analyzing the subset of documents further comprises determining a rate of responding to communications by the person over a period of time, and wherein the performance metric further reflects the rate of responding to communications.

(C5) In some embodiments of the method of C1, the method further includes determining that a difference between the value of the performance metric associated with the person and an aggregate value of the performance metric associated with an organizational unit associated with the person exceeds a pre-defined threshold. Additionally, the method also includes generating an alert referencing the value of the performance metric.

(C6) In some embodiments of the method of C1, the method further includes determining that a difference between the value of the performance metric associated with the person and a historic value of the performance metric associated with the person exceeds a pre-defined threshold. Additionally, the method also includes generating an alert referencing the value of the performance metric.

(C7) In some embodiments of the method of C1, analyzing the subset of documents further includes applying, to the subset of documents, a set of production rules yielding the completion status of the task.

(C8) In some embodiments of the method of C1, analyzing the subset of documents further includes applying, to the subset of documents, a trainable classifier producing the completion status of the task.

(C9) In some embodiments of the method of C1, analyzing the subset of documents further includes applying, to the subset of documents, a neural network producing the completion status of the task.

(C10) In some embodiments of the method of C1, the plurality of documents is provided by an electronic mailbox comprising a plurality of electronic mail messages.

(C11) In some embodiments of the method of C1, the method further includes visually representing the value of the performance metric via a graphical user interface.

(C12) In another aspect, a method of evaluating performance of a person includes processing, by a computer system, a plurality of documents which records communications of a person to identify a task assigned to the person. The method also includes identifying a subset of the plurality of documents, wherein the subset of documents is associated with the task. Additionally, the method includes analyzing the subset of documents to identify a level of sentiments associated with the task. Further, the method includes determining a value of a performance metric associated with the person, wherein the value of the performance metric reflects the level of sentiments.

(C13) In some embodiments of the method of C12, determining the value of the performance metric further includes analyzing the subset of documents to identify a completion status of the task.

(C14) In some embodiments of the method of C12, the method further includes determining that a difference between the value of the performance metric associated with the person and a reference value of the performance metric exceeds a pre-defined threshold. Additionally, the method also includes generating an alert referencing the value of the performance metric.

(C15) In some embodiments of the method of C12, the method further includes visually representing the value of the performance metric via a graphical user interface.

(C16) In yet another aspect, a non-transitory, computer-readable storage medium includes executable instructions that, when executed by a computer system, cause the computer system to process a plurality of documents which record communications of a person to identify a task assigned to the person. The executable instructions also cause the computer system to apply, to the plurality of documents, a trainable classifier to identify a completion status of the task. Additionally, the executable instructions cause the computer system to determine a value of a performance metric associated with the person, wherein the value of the performance metric reflects the completion status of the task.

(C17) In some embodiments of the non-transitory, computer-readable storage medium of C16, determining the value of the performance metric further includes analyzing the plurality of documents to determine a number of tasks of a given category completed by the person within a specified period of time.

(C18) In some embodiments of the non-transitory, computer-readable storage medium of C16, determining the value of the performance metric further includes analyzing the plurality of documents to determine a level of sentiments associated with the task.

(C19) In some embodiments of the non-transitory, computer-readable storage medium of C16, the non-transitory, computer-readable storage medium further includes executable instructions that cause the computer system to determine that a difference between the value of the performance metric associated with the person and a reference value of the performance metric exceeds a pre-defined threshold. Additionally, the executable instructions also cause the computer system to generate an alert referencing the value of the performance metric.

(C20) In some embodiments of the non-transitory, computer-readable storage medium of C16, the non-transitory, computer-readable storage medium further includes executable instructions that cause the computer system to visually represent the value of the performance metric via a graphical user interface.

Additional examples are explained in further detail below.

BRIEF DESCRIPTION OF THE DRAWINGS

A more particular description may be had by reference to the features of various embodiments, some of which are illustrated in the appended drawings. The appended drawings illustrate pertinent example features of the present disclosure. The description may admit to other effective features as the person of skill in the art will appreciate upon reading this disclosure.

In accordance with common practice, like reference numerals denote like features throughout the specification and figures.

DETAILED DESCRIPTION

Figure 1:
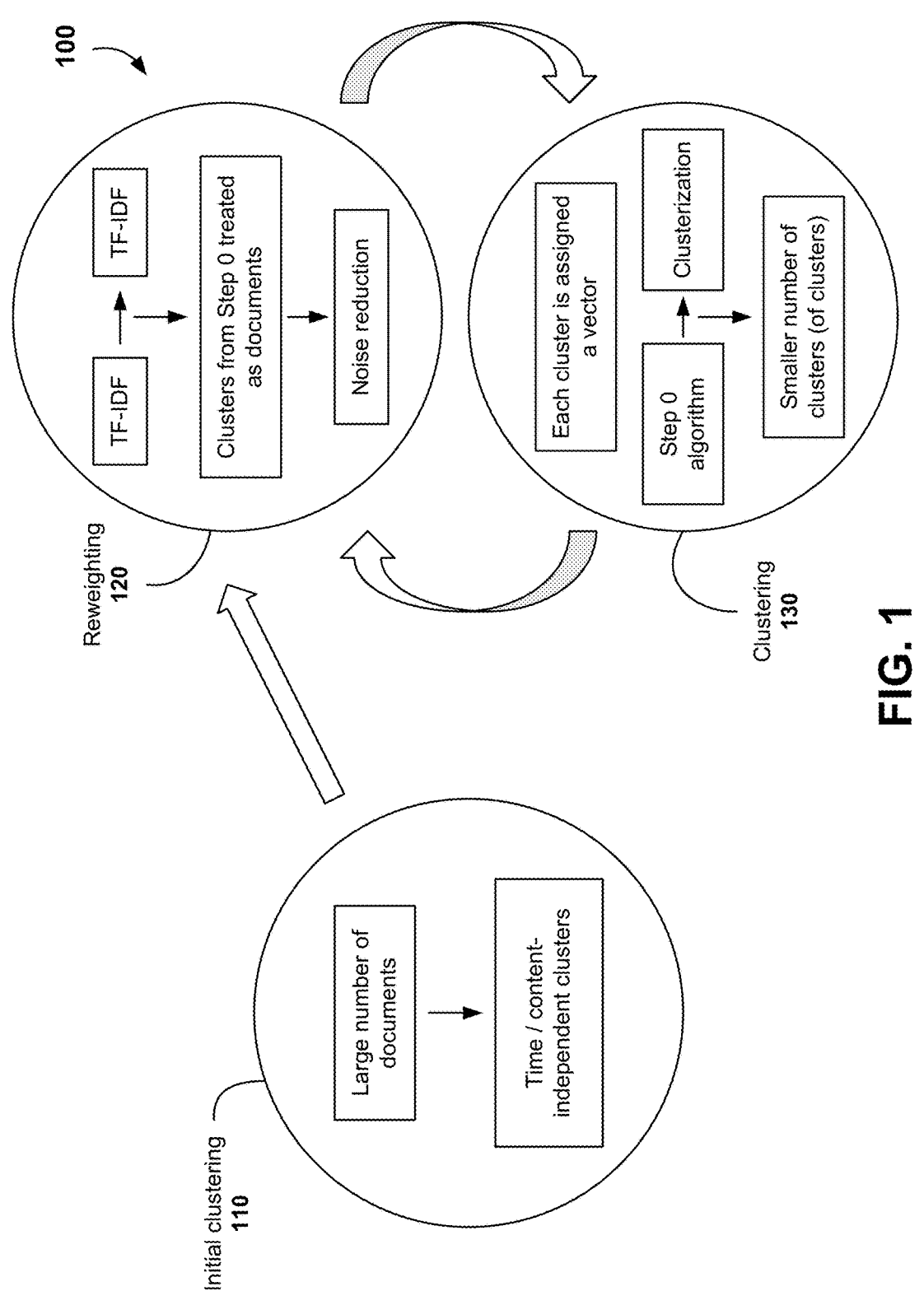
FIG. 1 schematically illustrates an example recursive agglomerative clustering procedure implemented in accordance with one or more aspects of the present disclosure.

Described herein are systems and methods for recursive agglomerative clustering of time-structured communications.

The efficiency of handling large volumes of information conveyed by multiple documents may be improved by performing document classification, i.e., associating each textual document with a category of documents. Document clustering is a classification methodology which involves grouping a set of documents into a plurality of clusters, such that the number of clusters and/or distinguishing characteristics of each clusters may not a priori be known.

Results of document clustering may be visualized by representing each document by a vector (or a point) in the hyperspace of document features. Various document clustering methodologies are based on the notion of the local density in the vicinity of the point representing a document, where the density is measured by the number of neighboring points found within the vicinity of a given point. Thus, a cluster may be represented by a group of points that has a relatively higher density than its surrounding areas. The documents that are not assigned to any clusters may be considered as outliers conveying the informational noise.

In an illustrative example, according to a DBSCAN algorithm, documents may be assigned to clusters by a procedure that groups together the points that have a relatively high number of nearby neighbors (e.g., the number of neighbors exceeding a threshold value), marking as outliers the points that lie in low-density regions. The algorithm preserves mutual reachability of documents within a single cluster—that is, for any pair of documents from a certain cluster, there should be a path which is completely contained within the cluster and that passes through the core of the cluster. In another illustrative example, according to an OPTICS algorithm, the problem of detecting meaningful clusters in a data set of varying density is addressed by linearly ordering the points such that the points which are spatially closest become neighbors in the ordering. Additionally, a special value is stored for each point that represents the density which needs to be accepted for a cluster in order to have both points belong to the same cluster.

However, the inventors noted that applying various local density-based clustering methods to electronic mail messages does not always produce satisfactory results. Electronic mail messages represent a special type of textual documents, in that they follow a certain structure, which specifies certain mandatory fields (such as sender, receiver, one or more timestamps, etc.) and optional fields which may be left blank (such as the subject of the message, the body of the message, reference to related messages, etc.). Bodies of electronic mail messages are usually relatively shorter than those of other document types, which may impair the ability of common document classification methods to produce useful results when applied to electronic mail messages, since common classification methods usually operate on document features that are extracted from document bodies. Furthermore, being unaware of the electronic mail message structure that describes various metadata fields, common classification methods may fail to extract and utilize some useful information that may be conveyed by various metadata fields of electronic mail messages.

The present disclosure addresses the above-noted and other deficiencies of common document classification methods, by providing methods of recursive agglomerative clustering which take into account document metadata, such as timestamps, message subjects, and sending/receiving party identifiers, as described in more detail herein below. Thus, implementations of the present disclosure represent improvements to the functionality of general-purpose and/or specialized computer systems.

The systems and methods described herein facilitate efficient navigation through large collections of documents, by classifying the documents and visually representing the classification results. In certain implementations, a clustering procedure may operate on the document features that are extracted from the sender and recipient identifiers specified by each message, such as the sender address (specified by From: field of the electronic mail message header) and one or more recipient addresses (specified by To: and Cc: fields of the electronic mail message header). In order to further improve the clustering quality, the clustering procedure may include several consecutive stages, such that each stage employs a special technique of re-weighting the components of the document feature vector. Clustering methods of the present disclosure do not require any supervised learning, thus efficiently implementing the data-driven approach to data classification.

The systems and methods described herein may be implemented by hardware (e.g., general-purpose and/or specialized processing devices, and/or other devices and associated circuitry), software (e.g., instructions executable by a processing device), or a combination thereof. Various aspects of the methods and systems are described herein by way of examples, rather than by way of limitation. In particular, certain specific examples are referenced and described herein for illustrative purposes only and do not limit the scope of the present disclosure to any particular bus width values.

As noted herein above, a document (e.g., an electronic mail message) may be represented by a vector of features, which are derived from the terms extracted from the document body and/or document metadata. Accordingly, a named entity extraction pipeline may be employed to extract the named entities from To:, Cc:, and/or From: fields of a corpus of electronic mail messages (e.g., a user's electronic mailbox). In certain implementations, another named entity extraction pipeline may be employed to extract the named entities from the body and/or subject line of the electronic messages. In certain implementations, yet another extraction pipeline may be employed for extracting document timestamps.

Each extracted entity name may be case-normalized and transformed into one or more terms, such that each term would comprise one or more tokens (words) of the entity name. In an illustrative example, the entity name "John Smith" would produce the following terms: "John," "Smith," and "John Smith."

Electronic mail addresses may be tokenized into the name part and domain part. In an illustrative example, the electronic mail address JohnSmith@data.services.com would produce the following name terms: "John," "Smith," and "John Smith" and the following domain terms: "Data," "Services," "Data Services." The top-most domain (e.g., .com, .org, etc.) may be discarded as it usually does not convey any useful information.

Every document may then be mapped to a multi-dimensional sparse vector in the hyperspace of the document features, e.g., using the Term Frequency-Inverse Document Frequency (TF-IDF) weighting scheme, according to which each document is represented by a vector of term frequency-inverse document frequency (TF-IDF) values.

Term frequency (TF) represents the frequency of occurrence of a given word in the document:

$$tf(t, d) = \frac{n_t}{\sum n_k}$$

where t is the word identifier, d is the document identifier, $n_t$ is the number of occurrences of the word t within document d, and $\sum n_k$ is the total number of words within document d.

Inverse document frequency (IDF) is the logarithmic ratio of the number of documents in the analyzed corpus to the number of documents containing the given word:

$$idf(t, d) = \log\left(\frac{N_d}{df_t}\right)$$

where $N_d$ is the number of documents in the corpus being analyzed, and $df_t$ is number of documents which contain the word t.

Thus, each document may be represented by a vector of TF-IDF values corresponding to the words comprised by the document:

$$V_d = [w_1, w_2, \ldots, w_n]$$

where $$w_t = tf_t \log\left(\frac{N_d}{df_t}\right)$$

$tf_t$ is the term frequency of term t in document d, $N_d$ is the number of documents, and $df_t$ is the number of documents containing the term t.

Communication between people may be viewed as a time structured process, hence, in certain implementations, the clustering procedure may further take into account the timestamps of the documents. Accordingly, the distance between two documents in the hyperspace of the document features may be represented by a product of the time-sensitive factor and the content-sensitive factor as follows:

$$S(\underline{V}_{d1}, \underline{V}_{d2}) = S_{time} * S_{con}$$

$$S_{time} = 1 + \frac{|t_{d1} - t_{d2}|}{T}$$

$$S_{con} = \frac{2}{\pi} * \arccos\left(\frac{\underline{V}_{d1} * \underline{V}_{d2}}{\|\underline{V}_{d1}\| * \|\underline{V}_{d2}\|}\right)$$

where T is the time sensitivity parameter, and $t_{d1}$, $t_{d2}$—document timestamps, $\underline{V}_{d1}$, $\underline{V}_{d2}$—document vectors.

The normalized angular form of $S_{com}$ instead of the cosine similarity is chosen in order to produce a normalized distance metric whose values would range from 0 to 1.

While various implementations of clustering procedures may suffer from very high computational complexity due to the need of computing distance metric values for a large number for document pairs, the methods and systems of the present disclosure alleviate this issue by avoiding the need to compute the computationally expensive $S_{com}$ component if the computationally cheap $S_{time}$ component exceeds a certain threshold.

In order to further improve the clustering quality, the clustering procedure may include several consecutive stages, such that each stage employs a special technique of re-weighting the components of the document feature vector. FIG. 1 schematically illustrates an example recursive agglomerative clustering procedure implemented in accordance with one or more aspects of the present disclosure. The clustering procedure may start by utilizing the above-described or a similar distance metric to perform the initial clustering operation 110 for partitioning a large number of input documents into a relatively large number of clusters.

The inventors noted that terms which are shared by large amount of clusters are noisy, and reducing their weight may be beneficial for increasing the clustering quality. The inventors further noted that the majority of such noisy terms are within a small amount of large clusters formed by the initial clustering operation. Based on these observations, reweighting operation 120 of FIG. 1 may re-calculate the TF-IDF metrics as described in more detail herein below.

Treating every cluster as a document, the IDF component of the term weight may be defined as follows:

$$IDF_t = \log\left(\frac{NC_0}{cf_{t,0}}\right)$$

where $NC_0$ is the number of clusters produced by the initial clustering operation, and $cf_t$ is the number of clusters containing term t.

Furthermore, taking only NCtop clusters into account:

$$IDF_{top,t} = \log\left(\frac{NC_{top,0}}{cf_{top,t,0}}\right)$$

where $cf_{top,t,0}$ is the number of top clusters containing term t, and $IDF_{opt}$ by design has small value for terms shared by large number of top clusters.

In order to alleviate the negative effect of noisy terms, the IDF metric may be modified as follows:

$$IDF_{opt,t} = \log\left(\frac{NC_{top,0}}{cf_{top,t0}}\right) < LC$$

and $$IDF_{opt,t} = IDF_t \text{ otherwise}$$

where LC is a global clustering parameter which balances the choice between noisy and information-bearing terms.

Clustering operation 130 of FIG. 1 treats every initial cluster as a document and associates the following vector with every cluster:

$$V_{c,0} = [w_{1,0}, w_{2,0}, \ldots, w_{n,0}]$$

where $$w_{t,0} = tf_{t,0} IDF_{opt,t}$$

and $tf_{t,0}$ is term frequency of term t in cluster c.

The resulting vectors are then clusterized by a density-based clustering procedure. In an illustrative example, documents may be assigned to clusters by a procedure that groups together the points that have a relatively high number of nearby neighbors (e.g., the number of neighbors found within a specified vicinity of a given point should exceed a threshold value), marking as outliers the points that lie in the remaining low-density regions. Thus, clustering operation 130 of FIG. 1 produces a significantly lower number of clusters as compared to the initial number of clusters: while some of the clusters produced by initial clustering operation 110 may survive the subsequent clustering operation 130, at least some of the initial clusters would be merged by the subsequent clustering operation 130.

In certain implementations the reweighting and clustering operations 120-130 may be iteratively repeated until the number of clusters has stabilized (i.e., is not significantly changed by performing the last reweighting/clustering operation). Iteratively applying clustering and reweighting steps gradually improves the clustering quality through aggregation of small clusters produced by the previous iteration, followed by discrimination of noisy features. Thus, the clustering procedure produces a relatively small number of large clusters reflecting the user activity structured by communication and temporal aspects.

Figure 2:
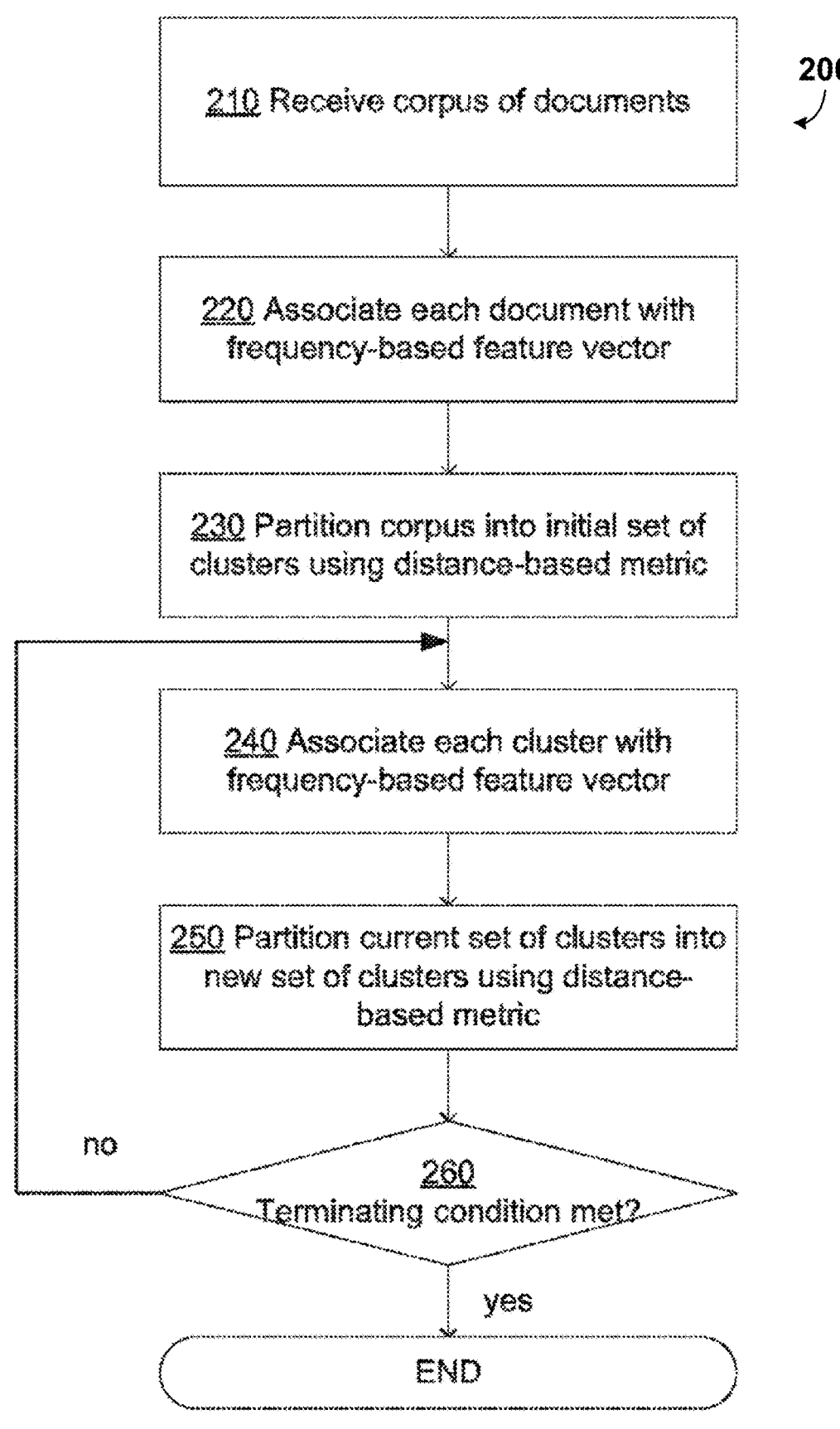
FIG. 2 depicts a flow diagram of an example method of recursive clustering, in accordance with one or more aspects of the present disclosure.

FIG. 2 depicts a flow diagram of an example method 200 of recursive clustering, in accordance with one or more aspects of the present disclosure. Method 200 produces the initial sets of document clusters and then iteratively treats the clusters produced by the previous iteration as documents which are further clusterized, as described in more detail herein above with reference to FIG. 1. Method 200 and/or each of its individual functions, routines, subroutines, or operations may be performed by one or more processors of the computer system (e.g., the computer system 400 of FIG. 4) implementing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, the computer system implementing the method may receive a document corpus comprising a plurality of documents. In an illustrative example, the document corpus may be provided by an electronic mailbox comprising a plurality of electronic mail messages.

At block 220, the computer system may associate each document of the document corpus with a vector of real values, such that each real value reflects a frequency-based metric of a term comprised by the document. In various illustrative examples, the term may be provided by an identifier of a named entity comprised by the document or a time identifier (such as a timestamp) associated with the document. The frequency-based metric may be provided by a TF-IDF metric, as described in more detail herein above.

At block 230, the computer system may partition the corpus of documents into an initial set of document clusters by a density-based clustering procedure which utilizes distance-based metric reflecting distances between the vectors representing the documents. In an illustrative example, the distance between two vectors representing two documents may be reflected by a function of a time-sensitive factor and a content-sensitive factor. The time-sensitive factor may take into account the difference between the timestamps of the documents The content-sensitive factor may be computed based on the TF-IDF metric values of the terms comprised by the documents. Thus, the distance metric may be expressed by the following equations:

$$S(\underline{V}_{d1}, \underline{V}_{d2}) = S_{time} * S_{con}$$

$$S_{time} = 1 + \frac{|t_{d1} - t_{d2}|}{T}$$

$$S_{con} = \frac{2}{\pi} * \arccos\left(\frac{\underline{V}_{d1} * \underline{V}_{d2}}{\|\underline{V}_{d1}\| * \|\underline{V}_{d2}\|}\right)$$

as described in more detail here above.

At block 240, the computer system may represent by a vector of real values each document cluster of the set of document clusters produced by the previous iteration, such that each real value reflects a frequency-based metric of a term comprised by the document cluster. In an illustrative example, the frequency-based metric may be provided by a function which reflects the ratio of the number of largest document clusters in the set of document clusters and the number of the largest clusters which include the term, which may be expressed by the following equations:

$$\text{IDF}_{opt,t}=\text{IDF}_{top,t} \text{ if IDF}_{top,t}<LC$$

$$\text{IDF}_{opt,t}=\text{IDF}_t \text{ otherwise}$$

as described in more detail herein above.

At block 250, the computer system may partition the set of document clusters produced by the previous iteration into a new set of document clusters by a density-based clustering procedure which utilizes a distance-based metric reflecting distances between the vectors representing the document clusters of the initial set of document clusters. In an illustrative example, each cluster may be represented by the following vector:

$$\underline{V}_{c,0}=[w_{1,0},w_{2,0}, \ldots ,w_{n,0}]$$

where $$w_{t,0}=tf_{opt,t}\text{IDF}_{opt,t}$$

and $tf_{t,0}$ is the term frequency of term t in cluster c.

The same distance metric as described herein above with reference to block 230 may be utilized for performing operations of block 250.

Responsive to determining, at block 260, that a terminating condition has been met, the method may terminate; otherwise, the method may loop back to block 240. In an illustrative example, evaluating the terminating condition may involve ascertaining that the number of clusters has stabilized (i.e., has not significantly changed by performing the last reweighting/clustering operation), as described in more detail herein above.

As noted herein above, the classification results may be visually represented via a graphical user interface. Visually representing the clusters may involve assigning a human-readable label to every cluster. Such a label should be short, it should reflect the cluster content, and should be distinctive from other cluster labels.

The cluster labeling method, operating in accordance with one or more aspects of the present disclosure, may start by sorting the clusters by the respective numbers of documents comprised by each cluster. For each cluster starting from the topmost one, a sorted list of terms may be built according to the term weights. All partial features introduced by the above-described tokenization procedure, such as parts of entity names, may be discarded when producing the sorted lists of terms.

The labeling method may initialize and maintain a dictionary of labels that have already been used as cluster labels. For each cluster starting from the topmost one, the first label from its sorted list of terms may be designated as the label for the cluster. If the cluster label is not found in the label dictionary, the label may be appended to the label dictionary, and the method may loop back to processing the next cluster on the list. Otherwise, if the cluster label has already been found in the label dictionary, the next term from the sorted list of terms may be appended to the cluster label, which may be repeated iteratively until the modified label is not found in the label dictionary, as described in more detail herein below with reference to FIG. 3.

Figure 3:
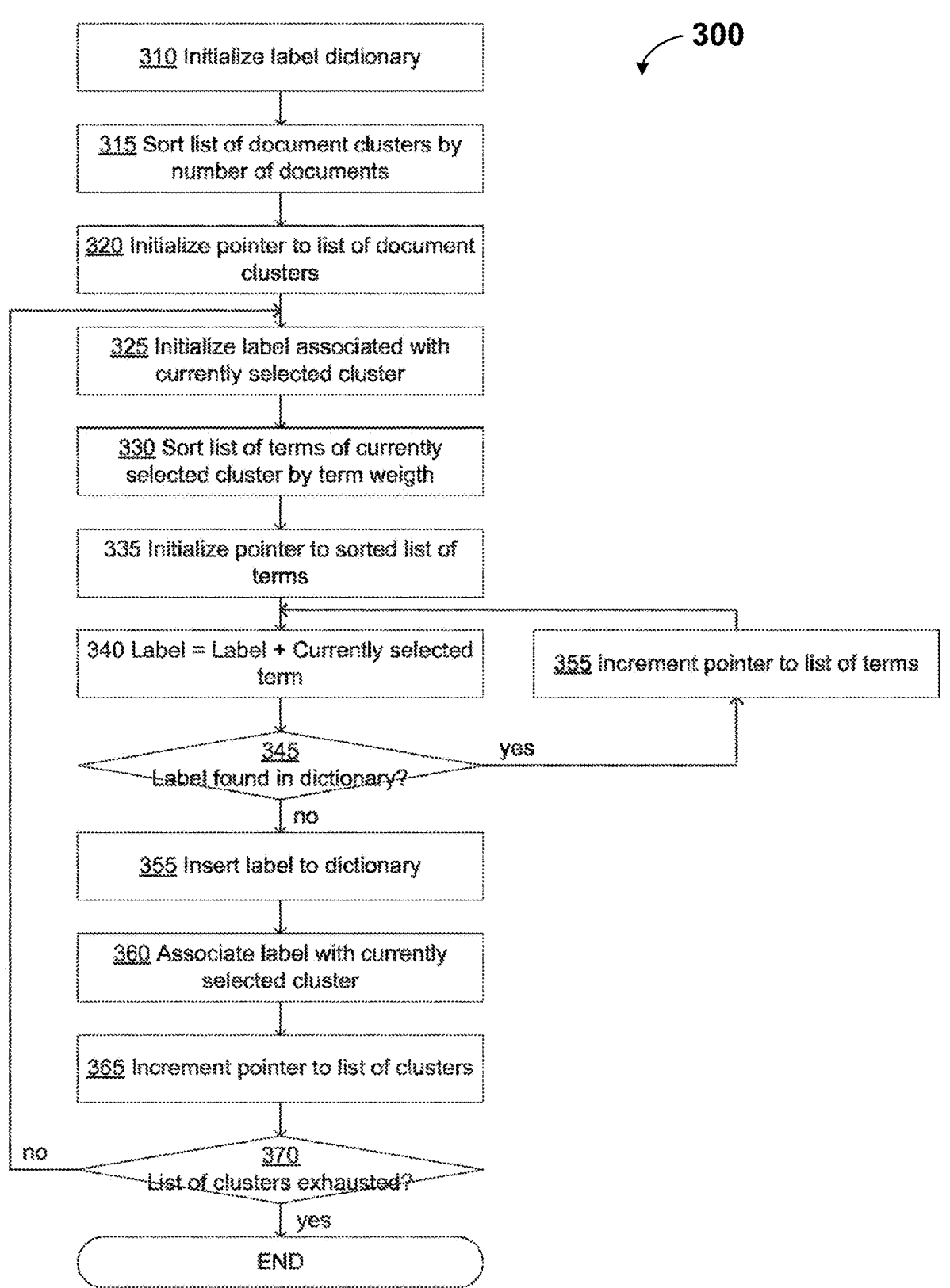
FIG. 3 depicts a flow diagram of an example method of document cluster labeling, in accordance with one or more aspects of the present disclosure.

FIG. 3 depicts a flow diagram of an example method 300 of document cluster labeling, in accordance with one or more aspects of the present disclosure. Method 300 produces the initial sets of document clusters and then iteratively treats the clusters produced by the previous iteration as documents which are further clusterized, as described in more detail herein above. Method 300 and/or each of its individual functions, routines, subroutines, or operations may be performed by one or more processors of the computer system (e.g., the computer system 400 of FIG. 4) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the computer system implementing the method may initialize, with an empty list, a label dictionary associated with a plurality of document clusters.

At block 315, the computer system may sort, in the descending order, the plurality of document clusters by the respective number of documents comprised by each cluster.

At block 320, the computer system may initialize the pointer to the sorted list of clusters to select the first cluster from the sorted list of clusters.

At block 325, the computer system may initialize, with an empty value, a label associated with the currently selected cluster.

At block 330, the computer system may sort by the term weight, in the descending order, the list of terms of the currently selected cluster. All partial features introduced by the above-described tokenization procedure, such as parts of entity names, may be discarded when producing the sorted lists of terms.

At block 335, the computer system may initialize the pointer to the sorted list of terms to select the first term from the sorted list of terms of the currently selected cluster.

At block 340, the computer system may append the currently selected term to the label associated with the currently selected cluster.

Responsive to determining, at block 345, that the label is found in the label dictionary, the computer system may, at block 350, increment the pointer to the list of terms, and the method may loop back to block 340. Otherwise, responsive to determining, at block 345, that the label is not found in the label dictionary, the computer system may, at block 355, insert the label into the label dictionary.

At block 360, the computer system may associate the label with the currently selected cluster.

At block 365, the computer system may increment the pointer to the sorted list of clusters. Responsive to determining, at block 370, that the list of cluster has not yet been exhausted, the method may loop back to block 325; otherwise, the method may terminate.

Figure 4:
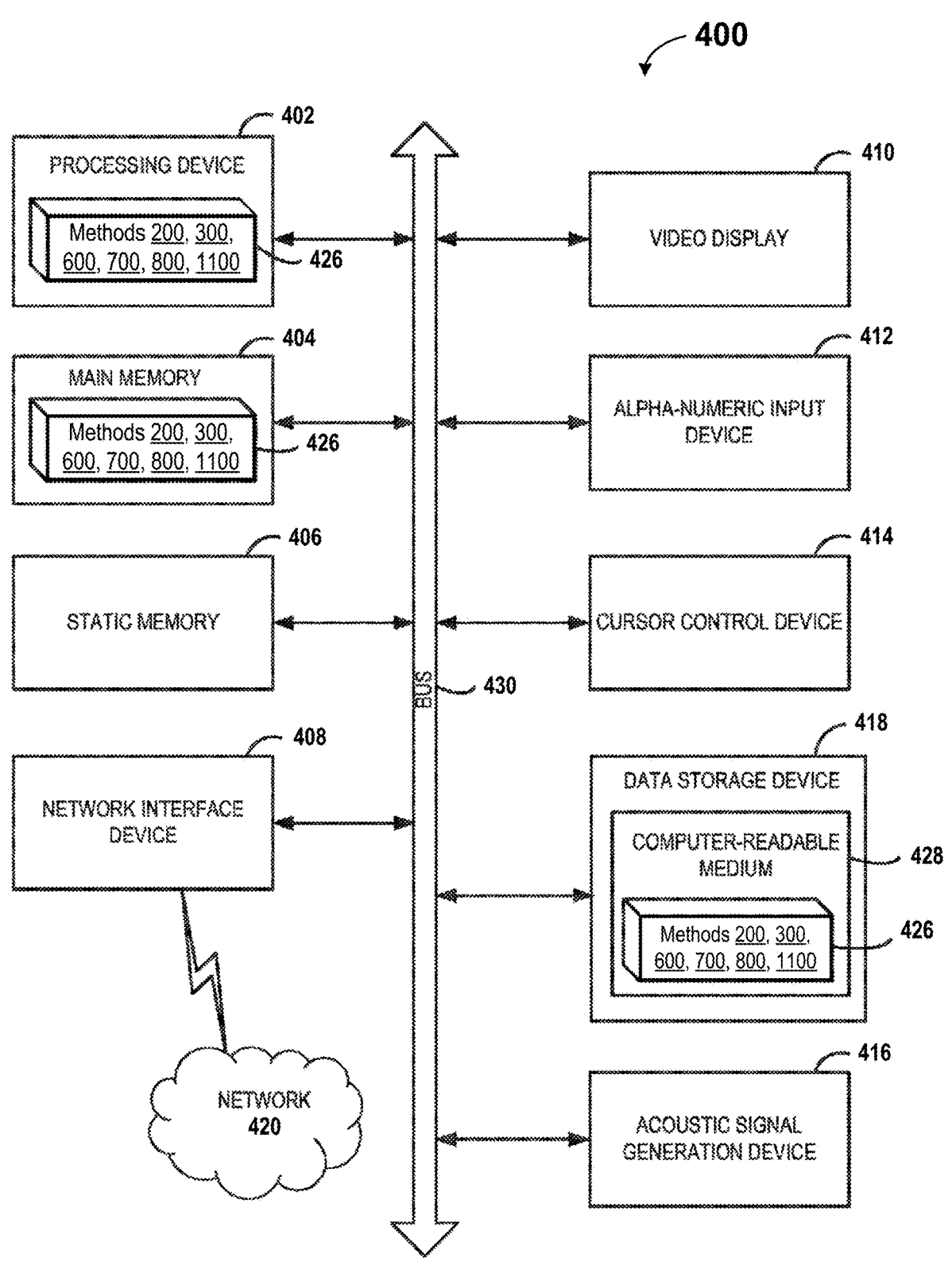
FIG. 4 schematically illustrates a component diagram of an example computer system which may perform the methods described herein.

FIG. 4 schematically illustrates a component diagram of an example computer system 400 which may perform the methods described herein. Example computer system 400 may be connected to other computer systems in a LAN, an intranet, an extranet, and/or the Internet. Computer system 400 may operate in the capacity of a server in a client-server network environment. Computer system 400 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 400 may comprise a processing device 402 (also referred to as a processor or CPU), a main memory 404 (e.g., read-only memory (ROM), flash memory, dynamic random-access memory (DRAM) such as synchronous DRAM (SDRAM), etc.), a static memory 406 (e.g., flash memory, static random-access memory (SRAM), etc.), and a secondary memory (e.g., a data storage device 418), which may communicate with each other via a bus 430.

Processing device 402 represents one or more general-purpose processing devices such as a microprocessor, central processing unit, or the like. More particularly, processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 402 may be configured to execute instructions implementing the methods described herein.

Example computer system 400 may further comprise a network interface device 408, which may be communicatively coupled to a network 420. Example computer system 400 may further comprise a video display 410 (e.g., a liquid crystal display (LCD), a touch screen, or a cathode ray tube (CRT)), an alphanumeric input device 412 (e.g., a keyboard), a cursor control device 414 (e.g., a mouse), and an acoustic signal generation device 416 (e.g., a speaker).

Data storage device 418 may include a computer-readable storage medium (or more specifically a non-transitory computer-readable storage medium) 428 on which is stored one or more sets of executable instructions 426. In accordance with one or more aspects of the present disclosure, executable instructions 426 may comprise executable instructions encoding various functions of the methods described herein, including method 200 of recursive clustering, method 300 of document cluster labeling, method 600 of constructing an encoder to be utilized for deriving numeric vector representations of natural language texts, method 700 of transforming a natural language text into a numeric vector representation, method 800 of performing information extraction tasks using anonymized representations of natural language texts, and/or method 1100 of performance evaluation based on processing structured communications, in accordance with one or more aspects of the present disclosure.

Executable instructions 426 may also reside, completely or at least partially, within main memory 404 and/or within processing device 402 during execution thereof by example computer system 400, main memory 404 and processing device 402 also constituting computer-readable storage media. Executable instructions 426 may further be transmitted or received over a network via network interface device 408.

While computer-readable storage medium 428 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random-access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus.

Various general-purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Various methods of textual information extraction and analysis may be applied to natural language texts. Notably, the original texts may contain sensitive information, including personal data (i.e., any information that relates to an identified or identifiable living individual), trade secrets, etc. Therefore, systems that process and store the original texts are inherently at risk of leaking this sensitive information.

The systems and methods of the present disclosure alleviate the above-referenced and other deficiencies of various common methods by converting a natural language text that potentially contains sensitive information into a representation that renders restoring the full original text impossible or at least impracticable (in particular, renders impossible restoring references to various entities that may be contained in the original text, such as names, locations, account numbers, addresses, etc., and other information that may identify persons, things, places, or entities), while preserving certain aspects of the content, for example, the semantic content and emotional coloring.

In accordance with one or more aspects of the present disclosure, the original text may be processed by a neural network (e.g., implementing the encoder part of an autoencoder). "Autoencoder" herein shall refer to a neural network that includes two parts: encoder, which transforms the input signal (e.g., a natural language text) into a compressed form (e.g., a vector of integers), and a decoder, which restores the original input signal from its compressed representation.

The input natural language text may be fed to a neural network implementing the encoder, which would produce a numeric representation of the original text. Various methods of information extraction and analysis may then be applied to the numeric representation of the original text in order to perform the desired information extraction tasks. Examples of tasks that may be performed using the numeric vector representations of natural language texts, in accordance with one or more aspects of the present disclosure, include processing various forms of recorded communications (including electronic mail messages, instant messages, voice mail message transcripts, etc.) in order to, for example, evaluate the efficiency of corporate communications, evaluate performance of teams and individuals, predict likely events (e.g., resignation of an employee), detect inappropriate behavior (e.g., sexual harassment) by an individual, and/or detect various intra-organizational or interpersonal conflicts or other issues.

The systems and methods described herein may be implemented by hardware (e.g., general-purpose and/or specialized processing devices, and/or other devices and associated circuitry), software (e.g., instructions executable by a processing device), or a combination thereof. Various aspects of the above referenced methods and systems are described in detail herein below by way of examples, rather than by way of limitation.

Figure 5:
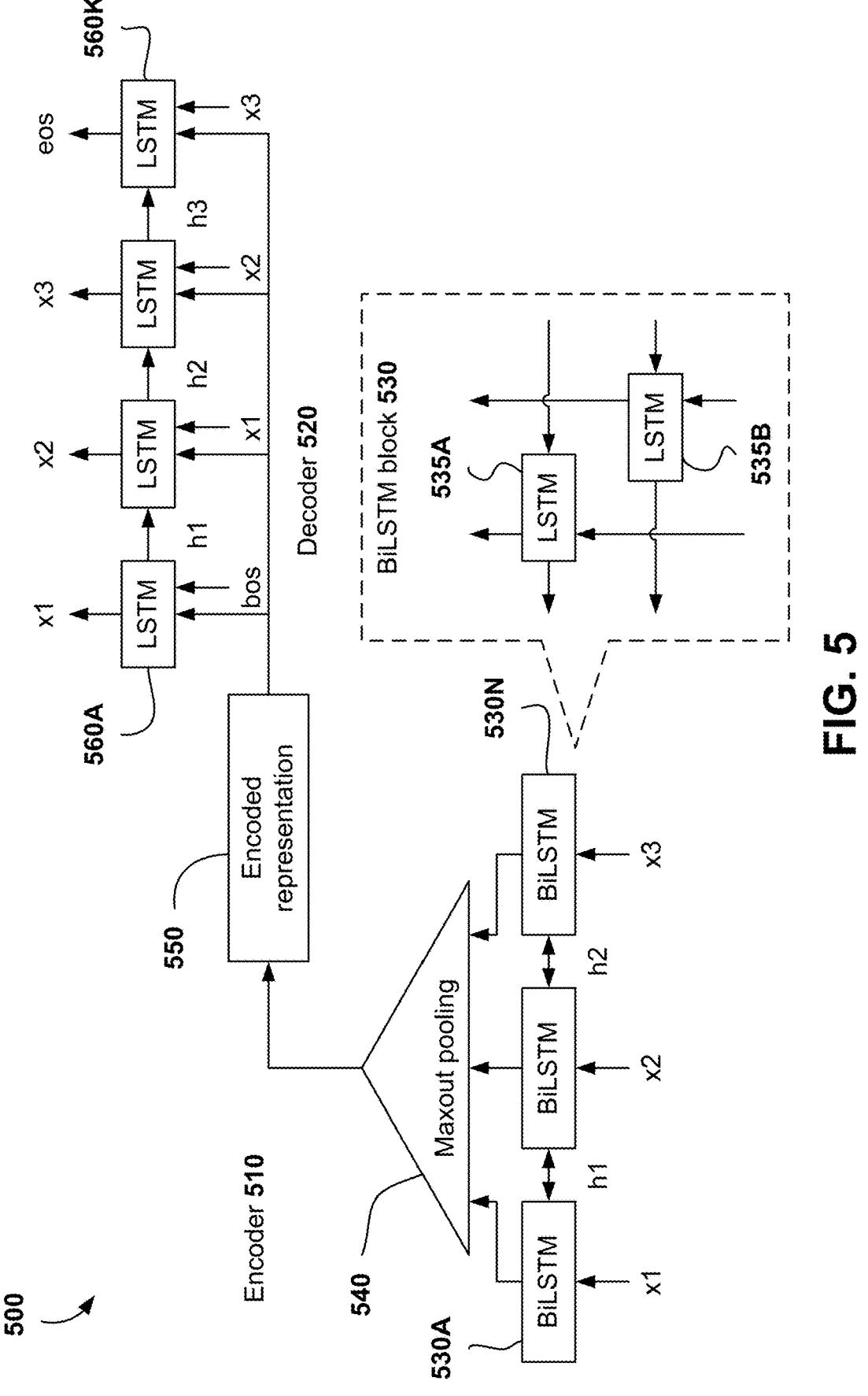
FIG. 5 schematically illustrates an example high-level architecture of a neural network that may be employed for producing a transformed representation of an input natural language text, in accordance with one or more aspects of the present disclosure.

FIG. 5 schematically illustrates an example high-level architecture of a neural network 500 that may be employed for producing a transformed representation of an input natural language text, in accordance with one or more aspects of the present disclosure.

A neural network is a computational model that applies to its input (e.g., a natural language) a set of transformations performed by multiple interconnected artificial neurons in order to produce an output (e.g., a numeric vector representing a natural language text). Conceptually, a neural network may be viewed as a network of nodes represented by artificial neurons, each of which may change its internal state according to an input and the node-specific activation function, and produces an output depending on the input and the node internal state. The artificial neural neurons are interconnected to form a directed weighted graph. The weights and the activation function parameters may be adjusted by a supervised or unsupervised training process, as described in more detail herein below.

As noted herein above, the neural network 500 utilized by the systems and methods of the present disclosure may include two functional components: encoder 510, which transforms the input natural language text or its intermediate representation (e.g., the term frequency/inverse document frequency TF-IDF representation) into an encoded representation (e.g., a numeric vector), and a decoder 520, which restores the original natural language text from its encoded representation.

The encoder 510 implements the following function:

$$E:X \rightarrow z$$

where X is the input signal (e.g., the input natural language text) and z is the compressed representation of the input signal (e.g., a numeric vector).

The decoder implements the following function:

$$D:z \rightarrow X'$$

where X' is the restored input signal approximating the input signal X

The particular form and implementation of the encoder and decoder functions may depend on the particular task being solved.

As shown in FIG. 5, the encoder 510 includes one or more layers of bidirectional Long-Short Term Memory (BiLSTM) blocks 530A-530N. Each BiLSTM block 530 includes a pair of Long-Short Term Memory (LSTM) blocks 535A-535B, such that one LSTM block 535A reads the input natural language text in the forward direction, while the other LSTM block 535B reads the input natural language text in the backward direction. The output of the last layer of BiLSTM blocks 530 is fed to the MaxPooling block 540 which summarizes its inputs to produce a single numeric vector of a fixed size, which is independent of the input signal size. This numeric vector provides the encoded (e.g., compressed) representation 550 of the input natural language text. In turn, the decoder 520 receives the compressed representation 550 and the result of the previous decoding iteration and recurrently restores the input natural language text. In the illustrative example of FIG. 5, the decoder 520 includes one or more layers of LSTM) blocks 560A-560K.

The neural network 500 implementing the autoencoder may be trained to minimize the difference between the input signal and the output signal, e.g., as follows:

$$E,D{:}argmin_{E,D}\|X{-}X'\|$$

where argmin denotes the argument of the minimum, i.e., the functions D, E which minimize the value of the difference between the input signal and the output signal, and $\| \ldots \|$ denotes the norm of its argument, such as p-norm (e.g., the Euclidean norm).

Thus, unsupervised training of the autoencoder may involve iteratively processing a training corpus of natural language texts. For each natural language text of the corpus, the values of z (the encoded representation of the natural language text) and X' (the restored original natural language text) may be computed, and the difference between those values $\|X{-}X'\|$ may be determined. The parameters of the encoder E and/or decoder D (e.g., the weights and the activation function parameters of the respective encoding or decoding part of the neural network) may be adjusted based on the computed difference after each iteration in order to minimize the value of $\|X{-}X'\|$, and at least some texts of the corpus may be processed again in order to determine the new values of z (the encoded representation of the natural language text), X' (the restored original natural language text), and their difference $\|X{-}X'\|$. After each iteration, a terminating condition may be evaluated, and the iterations may either continue or terminate. The terminating condition may, for example, be based on the difference $\|X{-}X'\|$ between the input signal X and its restored form X' falling below a predetermined threshold value and/or the number of iterations exceeding a predetermined threshold number.

Accordingly, the trained encoder 510 would encode, into the encoded representation 550, various semantic and linguistic features of the input natural language text. The resulting encoded representation 550 allows for certain natural language tasks be solved by performing mathematical transformations on the encoded representation 550.

In an illustrative example, numeric vectors produced by the encoder that represent semantically similar texts are strongly correlated, such that the angle between those vectors is relatively small (i.e., below a low threshold value). Conversely, vectors of semantically different texts would exhibit weak or no correlation, such that the angle between those vectors is relatively large (i.e., above a high threshold value). This feature in itself allows utilizing the numeric vector representations of natural language texts for semantic-based processing of natural language texts.

Since various natural language processing methods may be performed on the numeric vector representation of the natural language texts, the decoder may be discarded after completing the autoencoder training, thus impeding the restoration of the input natural language text. Furthermore, the output vector of the encoder may be further distorted by an irreversible transformation (i.e., a one-way function) that preserves the structure of the original vector. A function is one-way if its value may be computed by a polynomial time algorithm, but any polynomial time randomized algorithm that attempts to compute an inverse for that function (i.e., restore its argument based on a given value) succeeds with negligible probability. In order to preserve the structure of the original vector, a homomorphic transformation may be chosen (i.e., a transformation that specifies a mapping between two algebraic structures of the same type, such as groups, rings, or vector spaces).

Thus, applying the distorting transformation to the output vector of the encoder would further thwart any efforts directed to restoring the original text. Furthermore, applying the distorting transformation to the output vector of the encoder may lead to losing some information encoded by the numeric vector representations of the natural language texts. Thus, not only the text restoration from the transformed numeric representation would become impossible, but also it would be impossible to prove that a given numeric representation is derived from a particular text.

The distorting transformation constructed in accordance with aspects of the present disclosure preserves semantic and other features extracted from the natural language texts. Thus, the transformed numeric vector representations of natural language texts may be stored and processed instead of storing and processing the input natural language texts themselves. Furthermore, the transformed numeric vector representations of natural language texts may be utilized for solving certain tasks that were not contemplated at the time of training the autoencoder.

In an illustrative example, using a labeled text corpus, in which natural language texts are labeled to reflect their classification to a predetermined set of classification categories, such as Sport, Weather, Science, Conflict, etc., a model may be trained to infer the text classification from the numeric vector representation of the input text.

Figure 6:
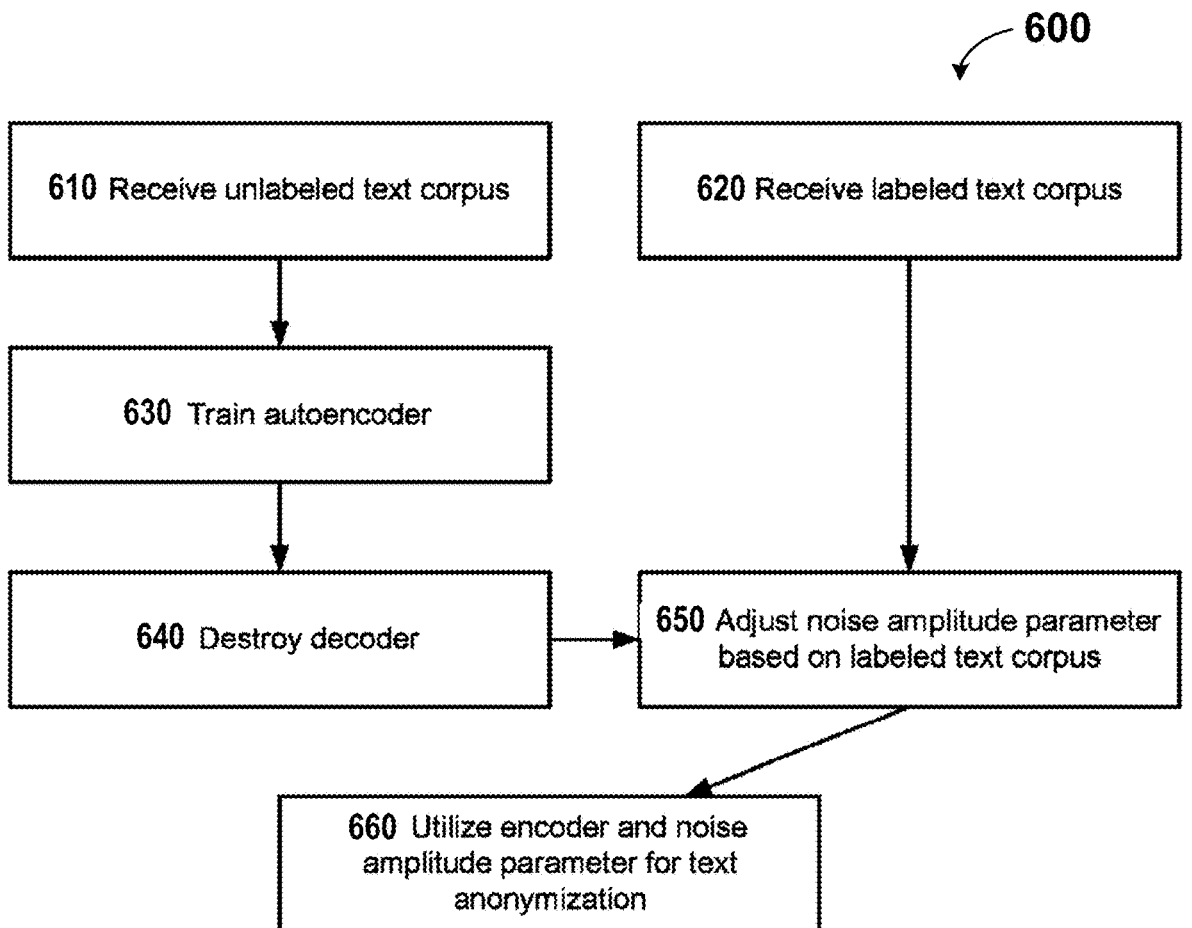
FIG. 6 depicts a flowchart of an example method of constructing an encoder to be utilized for deriving numeric vector representations of natural language texts, in accordance with one or more aspects of the present disclosure.

FIG. 6 depicts a flowchart of an example method 600 of constructing an encoder to be utilized for deriving numeric vector representations of natural language texts, in accordance with one or more aspects of the present disclosure. Method 600 and/or each of its individual functions, routines, subroutines, or operations may be performed by one or more processors of the computer system (e.g., the example computer system 400 of FIG. 4) implementing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other.

At blocks 610-620, the computer system implementing the method receives an unlabeled text corpus to be utilized for unsupervised training of the autoencoder and a labeled text corpus to be utilized for determining a value of a noise amplitude parameter of the distorting transformation. In certain implementations, the texts of the two corpora may be semantically similar to the texts to be processed by the trained models.

At block 630, the autoencoder is trained using the unlabeled text corpus, as described in more detail herein above.

At block 640, the decoder part of the autoencoder is discarded.

At block 650, the computer system determines the value of the noise amplitude parameter for distorting the output vector of the decoder part of the autoencoder. Determining the value of the noise amplitude parameter may involve identifying the maximum value of the noise amplitude parameter which, when applied to perform the distorting transformation of one or more texts of the labeled text corpus, produces distorted representations of those texts, such that the distorted representations are suitable for performing the desired natural language processing tasks. In an illustrative example, various optimization methods may be employed for determining the value of the noise amplitude parameter, e.g., the bisection method that involves iteratively bisecting the interval in which the function being optimized changes its sign (in the instant case, the function changing its sign is equivalent to the produced distorting transformation becoming unsuitable for performing the desired natural language processing tasks) and then selecting the subinterval in which the function changes sign.

At block 660, the encoder and the noise amplitude parameter are utilized for performing various natural language processing tasks.

Figure 7:
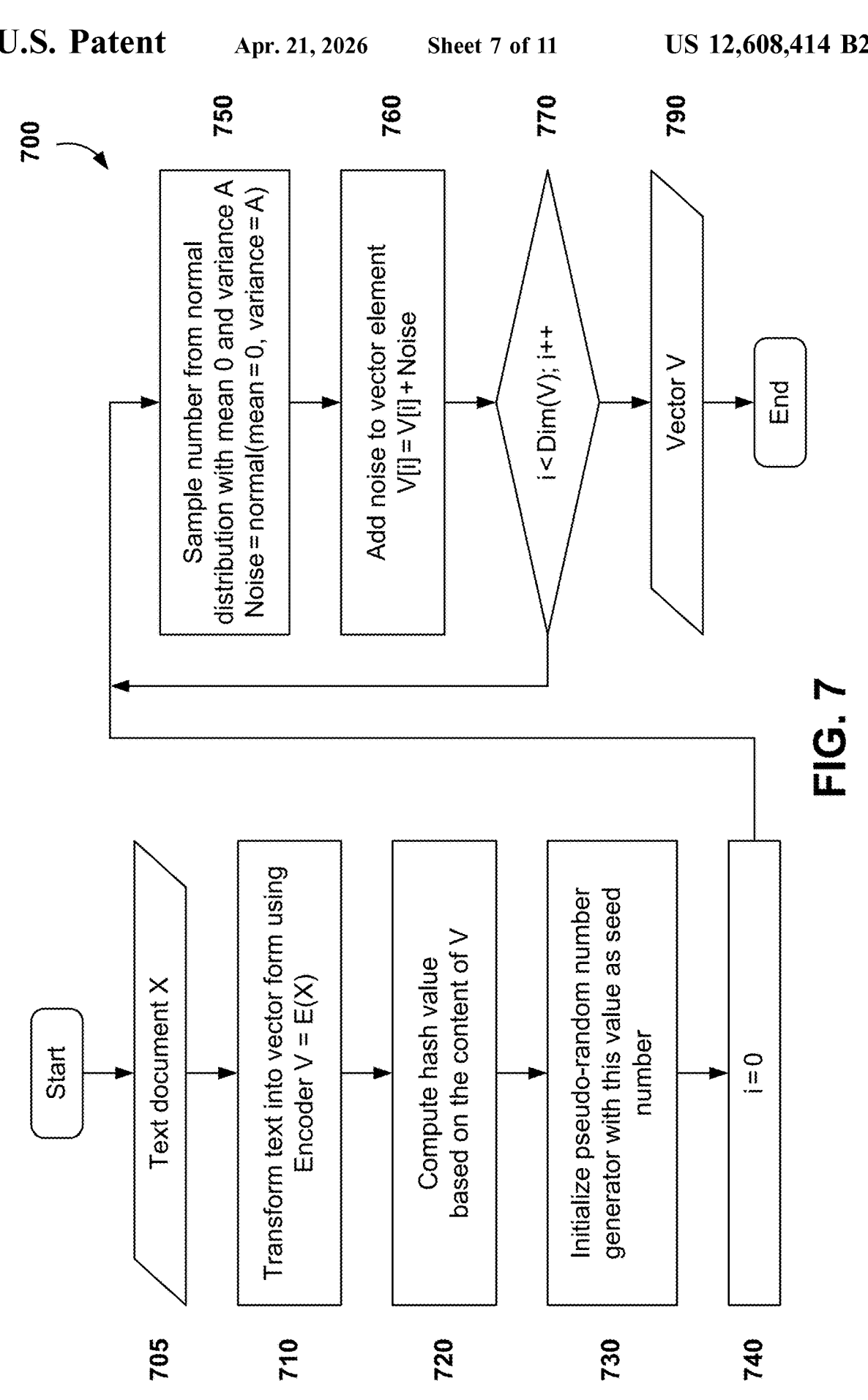
FIG. 7 depicts a flowchart of an example method of transforming a natural language text into a numeric vector representation, in accordance with one or more aspects of the present disclosure.

FIG. 7 depicts a flowchart of an example method 700 of transforming a natural language text into a numeric vector representation, in accordance with one or more aspects of the present disclosure. Method 700 and/or each of its individual functions, routines, subroutines, or operations may be performed by one or more processors of the computer system (e.g., the example computer system 400 of FIG. 4) implementing the method. In certain implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other.

At block 710, the computer system implementing the method utilizes an encoder to transform an input natural language text X (705) into a numeric vector representation:

$$V=E(X)$$

where X denotes the input natural language text, E denotes the transformation performed V denotes the numeric representation produced by the encoder.

At block 720, the computer system applies a hash function to compute a hash value of the numeric text representation. The hash function may be any suitable function that maps the numeric input of arbitrary size to a fixed-size numeric output.

At block 730, the computer system initializes a pseudo-random number sequence utilizing the computed hash value as the seed value.

At blocks 740-770, the computer system iterates through the components of the numeric vector representation V of the input natural language text. For each component of the vector, the computer system may sample, using the pseudorandom number sequence, a specified statistical distribution (e.g., a normal distribution having the mean of zero and the standard deviation of the noise amplitude parameter A, which can be determined as described in more detail herein above). The current component of the vector is then modified by adding the sampled value.

The resulting vector V (790) is the numeric representation of the input natural language text. Upon completing the operations of method 700, the source text may be discarded.

Figure 8:
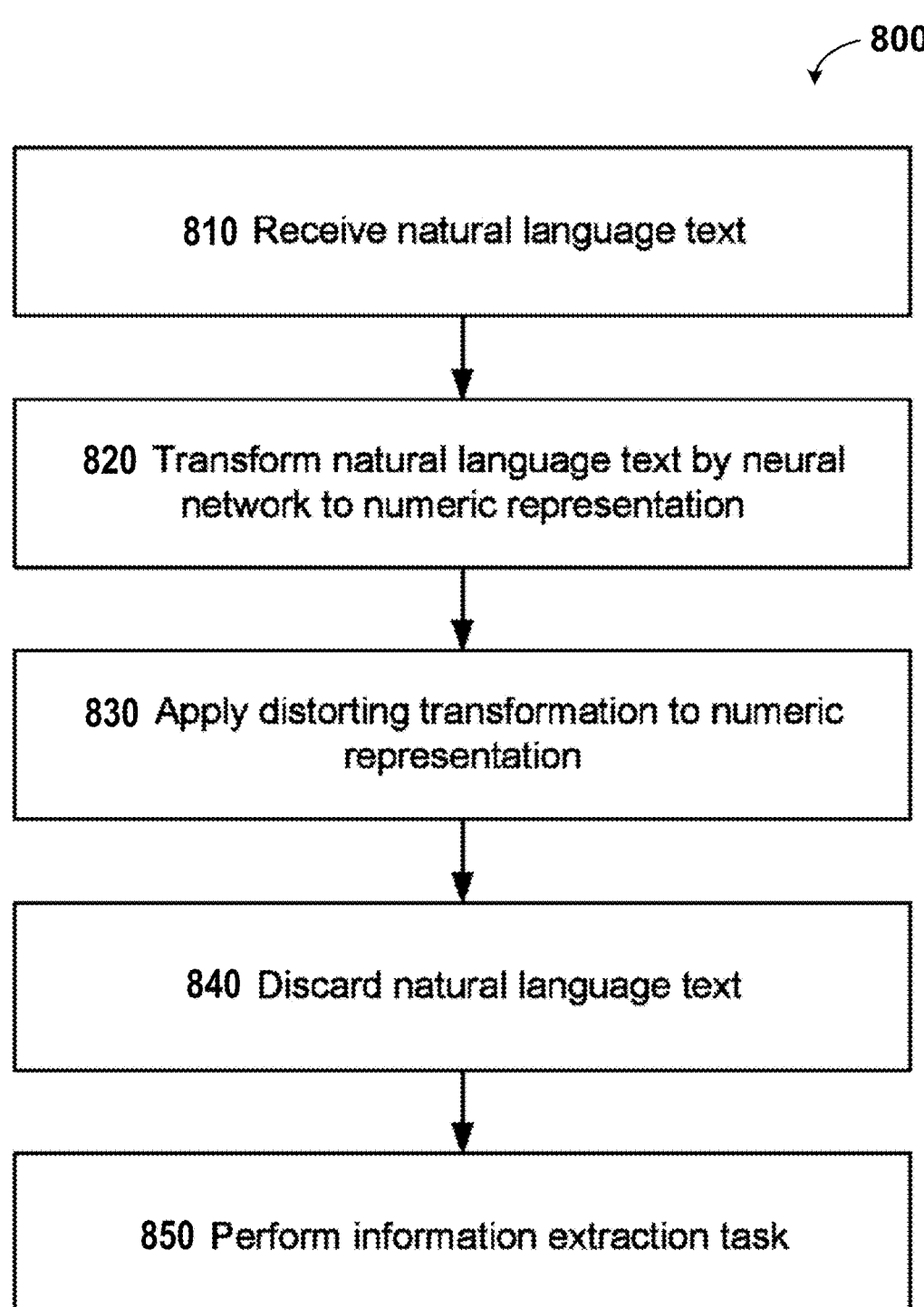
FIG. 8 depicts a flowchart of an example method of performing information extraction tasks using anonymized representations of natural language texts, in accordance with one or more aspects of the present disclosure.

FIG. 8 depicts a flowchart of an example method 800 of performing information extraction tasks using anonymized representations of natural language texts, in accordance with one or more aspects of the present disclosure. Method 800 and/or each of its individual functions, routines, subroutines, or operations may be performed by one or more processors of the computer system (e.g., the example computer system 400 of FIG. 4) implementing the method. In certain implementations, method 800 may be performed by a single processing thread. Alternatively, method 800 may be performed by two or more processing threads, each thread executing one or more individual functions, routines, subroutines, or operations of the method. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other.

At block 810, the computer system implementing the method receives a natural language text.

At block 820, the computer system transforms, by a neural network, the natural language text into a numeric representation (e.g., a numeric vector), as described in more detail herein above.

At block 830, the computer system applies, to the numeric representation of the natural language text, an irreversible transformation, as described in more detail herein above.

At block 840, the computer system discards the natural language text.

At block 850, the computer system performs, using the transformed numeric representation of the natural language text, one or more information extraction tasks. In an illustrative example, the transformed numeric representation of the natural language text is fed to a neural network that is pre-trained for performing the desired natural language processing task, such as an information extraction task, a text classification task, etc.

In some implementations, the natural language texts processed by the systems and methods of the present disclosure may include various forms of recorded communications (including electronic mail messages, instant messages, voice mail message transcripts, etc.).

In some implementations, a trained neural network may process a set of natural language texts in order to evaluate a process characterized by natural language texts. In an illustrative example, the neural network may produce one or more numeric values indicative of the quality of a workflow (by analyzing tasks, status reports, queries, innovation proposals). In another illustrative example, the neural network may produce one or more numeric values indicative of the outcome of the employee's onboarding process. In another illustrative example, the neural network may produce one or more numeric values indicative of the efficiency of corporate communications, etc.

In some implementations, a trained neural network may process a set of natural language texts in order to evaluate the likelihood of occurrence of a specified event or condition. In an illustrative example, the neural network may produce one or more numeric values indicative of the likelihood of resignation of an employee. In an illustrative example, the neural network may produce one or more numeric values indicative of the likelihood of risks of sensitive information leakage.

In some implementations, a trained neural network may process a set of natural language texts in order to evaluate one or more specified emotional aspects of the natural language text. In an illustrative example, the neural network may produce one or more numeric values indicative of the emotional state of employees and/or emotional context of an organization. In another illustrative example, the neural network may produce one or more numeric values indicative of the certain aspects of relationships of employees with their peers and managers (e.g., identifying praise, approval, congratulations, emotional pressure, etc.). In another illustrative example, the neural network may produce one or more numeric values indicative of positive and/or negative aspects of client feedback with respect to a product or service. In another illustrative example, the neural network may produce one or more numeric values indicative of motivation and involvement of employees in certain processes, workflows, etc. In another illustrative example, the neural network may produce one or more numeric values indicative of certain cultural features of the analyzed communications.

In some implementations, a trained neural network may process a set of natural language texts in order to identify certain conditions, situations, and/or issues. In an illustrative example, the neural network may produce one or more numeric values indicative of the likelihood of occurrence of an intra-organizational conflict. In another illustrative example, the neural network may produce one or more numeric values indicative of the likelihood of occurrence of a conflict of organization members with third parties (suppliers, clients, business partners, etc.). In another illustrative example, the neural network may produce one or more numeric values indicative of the likelihood of occurrence of an instance of sexual harassment by one party of the analyzed corporate communications with respect to another party of the analyzed corporate communications.

The neural network for processing the transformed numeric representations of the input natural language text may be trained on a labeled corpus of text and/or a labeled set of transformed numeric representations. The labels may indicate the known numeric values (to be interpreted in the context of the particular task, as explained above) associated with the respective transformed representations. Training the neural network may involve iteratively processing one or more labeled transformed numeric representations of the natural language texts, comparing the results produced by the neural network with the known numeric values specified by the respective labels, and adjusting the parameters of the neural network in order to minimize the difference between the results produced by the neural network with the known numeric values specified by the respective labels.

Numeric vector representations of natural language texts produced in accordance with one or more aspects of the present disclosure may be also utilized for performing various other natural language processing tasks, such as text classification, automatically structuring information based on its semantic content, etc.

Described herein are systems and methods for performance evaluation based on processing structured communications (e.g., electronic mail messages).

Employee performance evaluation is an integral element of human resource management processes in many organizations. Various common performance evaluation methods rely heavily on human-generated information, such as evaluation questionnaires, interview summaries, unstructured or weakly-structured feedback generated by the employee's supervisors, peers, and subordinates, etc. Apart from being highly subjective, such information requires considerable human effort to generate.

The present disclosure addresses the above-noted and other deficiencies of common performance evaluation methods, by providing methods of performance evaluation based on processing structured communications (such as electronic mail messages, instant messages, and/or voicemail transcriptions). The systems and methods of the present disclosure process a set of employee's electronic mail messages in order to extract information on various tasks assigned to and completed by the employee whose performance is being evaluated.

Figure 9:
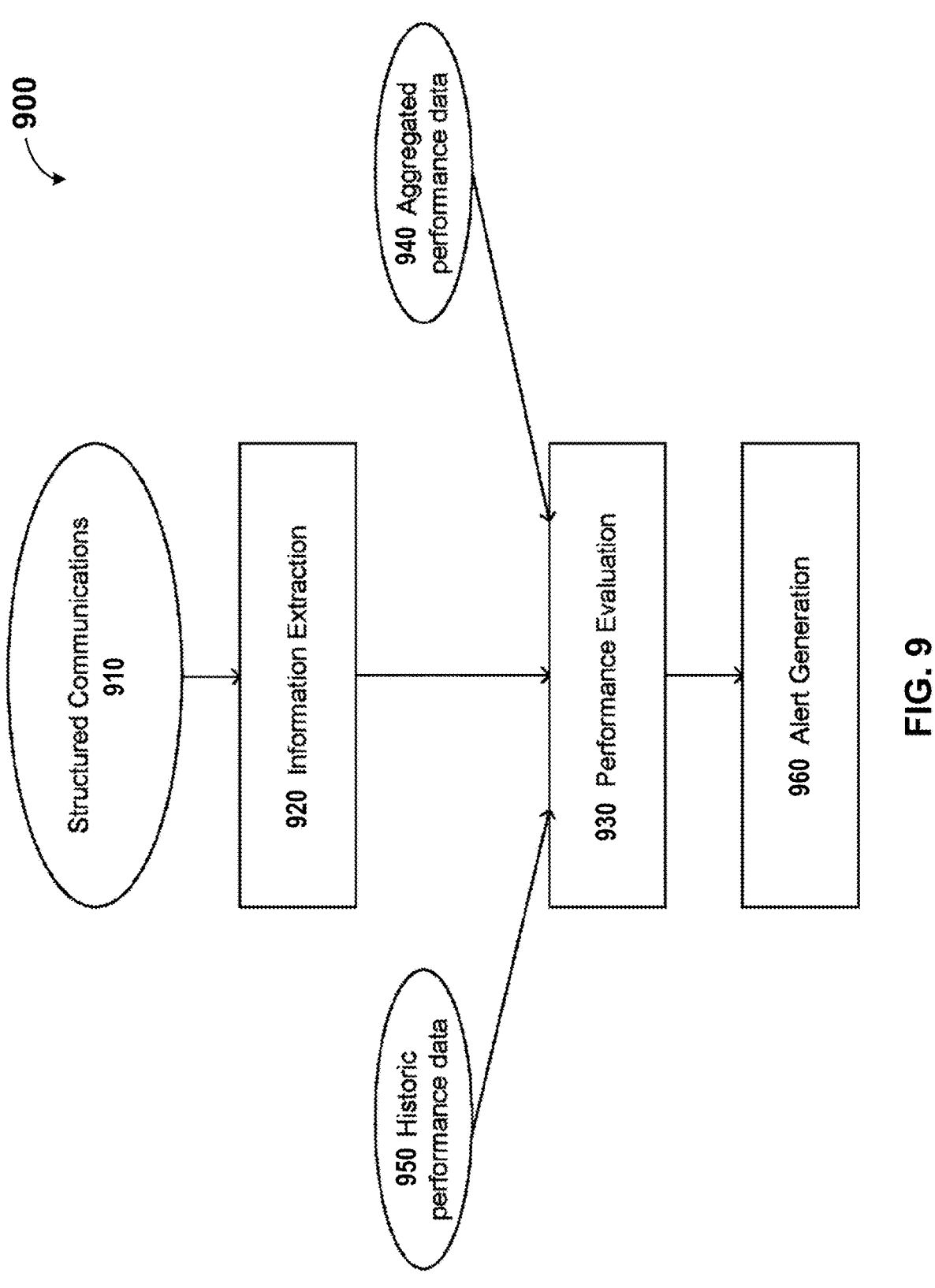
FIG. 9 schematically illustrates an example performance evaluation workflow implemented in accordance with one or more aspects of the present disclosure.

FIG. 9 schematically illustrates an example performance evaluation workflow 900 implemented in accordance with one or more aspects of the present disclosure. The information extraction engine 920 may process a set of structured communications 910 (e.g., electronic mail messages, instant messages, and/or voicemail transcriptions stored by a corporate messaging server) to identify one or more tasks assigned to an employee whose performance is being evaluated. For every task, the information extraction engine 920 may determine its current completion status, the time taken to complete the task, the task category, importance, and complexity, the level of sentiments associated with the task progress and results, and/or various other attributes of the task. The extracted information may be fed to the performance evaluation engine 930, which may compute values of a set of performance evaluation metrics (e.g., the rate of task completion for a given task category, importance, and/or complexity level, the task completion quality based on the detected level of sentiments, the effectiveness of employee's participation in collective work efforts based on the detected rate of responding to communications and associated level of sentiments, etc.). The performance evaluation engine may then compare the computed employee performance metrics to various aggregate performance metrics 940 (e.g., reflecting the average performance demonstrated by the employee's organizational unit and/or by the whole organization) and/or historic metrics 950 (e.g., parameters reflecting the performance of the same employee over one or more periods preceding the current periods). Should a significant deviation of the employee performance parameters from aggregate performance metrics 940 and/or historic performance metrics 950 be detected, the performance evaluation engine 930 may generate alerts 960 (e.g., in the form of electronic mail messages or instant messages) to the employee's supervisors, thus prompting them to reward the employee or take appropriate corrective actions, as described in more detail herein below.

The systems and methods described herein may be implemented by hardware (e.g., general-purpose and/or specialized processing devices, and/or other devices and associated circuitry), software (e.g., instructions executable by a processing device), or a combination thereof. Various aspects of the methods and systems are described herein by way of examples, rather than by way of limitation. In particular, certain specific examples are referenced and described herein for illustrative purposes only and do not limit the scope of the present disclosure.

Figure 10:
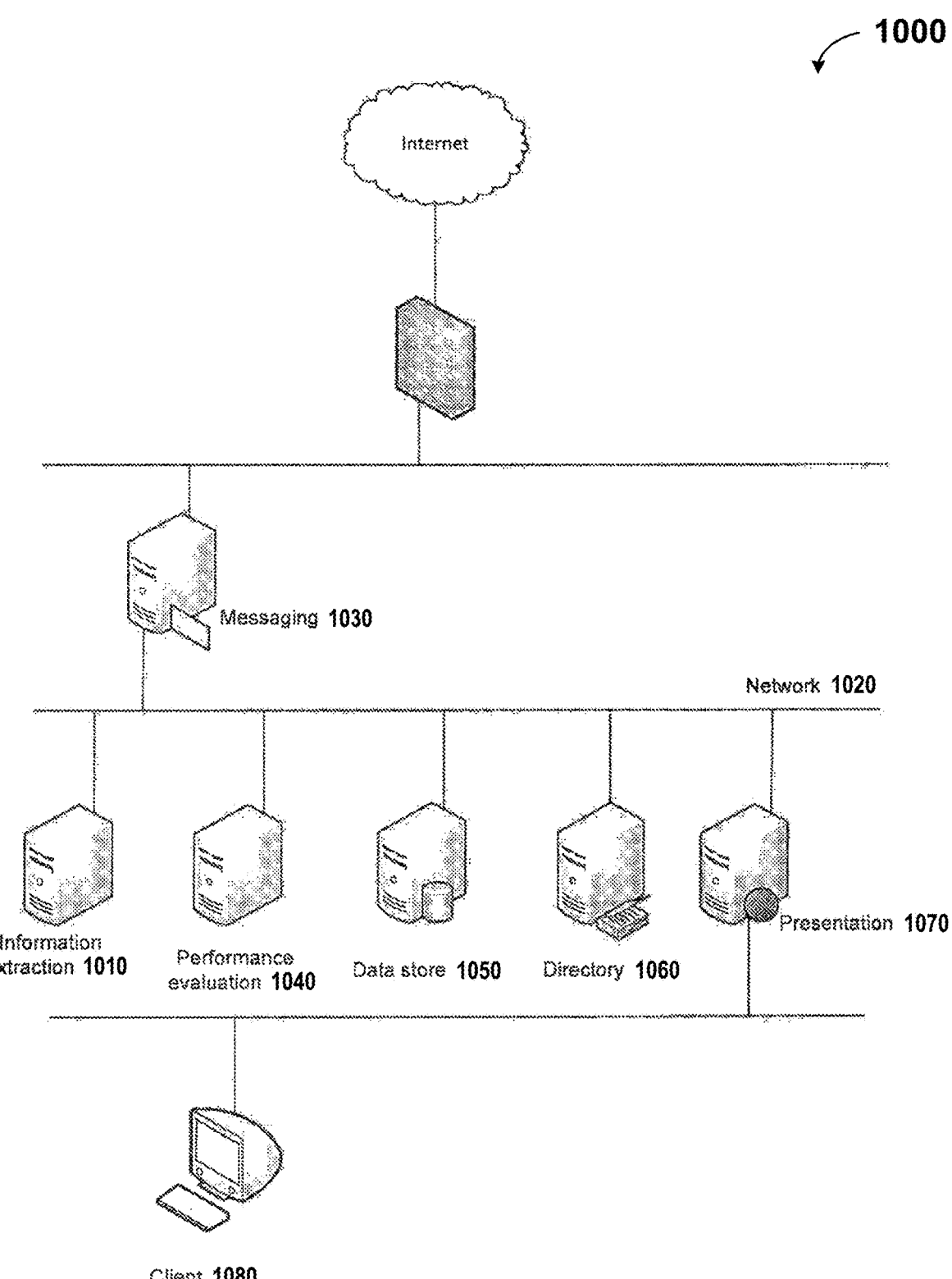
FIG. 10 schematically illustrates a high-level network diagram of a distributed computer systems implemented by a corporate network in which the systems and methods of the present disclosure may be implemented.

FIG. 10 schematically illustrates a high-level network diagram of a distributed computer systems implemented by a corporate network in which the systems and methods of the present disclosure may be implemented. As schematically illustrated by FIG. 10, the distributed computer system may comprise the information extraction server 1010 which may communicate, over one or more network segments 1020, with the corporate messaging server (e.g., electronic mail and/or instant messaging server) 1030, performance evaluation server 1040, data store 1050, directory server 1060, presentation server 1070, one or more client computers 1080, and various other computers connected to the corporate network 1000.

The information extraction server 1010 may process a set of structured communications (e.g., electronic mail messages, instant messages, and/or voicemail transcriptions stored by a corporate messaging server) to identify one or more tasks assigned to an employee whose performance is being evaluated and to further identify one or more attributes of each detected task. The information extraction server 1010 may perform the information extraction by applying a combination of statistical (e.g., trainable classifiers) and rule-based methods.

An example statistical method may use a Generalized Left-to-right parser producing Rightmost-derivation (GLR parser). On the front-end, a GLR parser converts an input text into parse tables, which allow multiple state transitions (given a state and an input token). When a conflicting transition is encountered, the parse stack is forked into two or more parallel parse stacks, such that the state corresponding to each possible transition is located at the top of the respective stack. Then, the next input token is read and used to determine the next transitions for each of the top states, at which stage further forking may occur. If any given top state and input token do not result in at least one transition, the corresponding path "path" through the parse tables is deemed to be invalid and is discarded. The parser thus produces a parse tree which describes syntactic relationships between various information objects referenced by tokens of the input text.

In another illustrative example, the information extraction server 1010 may employ one or more trainable classifiers, such that each classifier processes the input text to yield the degree of association of an information object referenced by an input text token with a specified ontology concept. Each classifier may implement various methods ranging from naïve Bayes to differential evolution, support vector machines, random forests, neural networks, gradient boosting, etc.

In another illustrative example, the information extraction server 1010 may employ one or more bi-directional recurrent neural networks (RNN). A recurrent neural network is a computational model which is based on a multi-staged algorithm applying a set of pre-defined functional transformations to a plurality of inputs and then utilizing the transformed data and the network stored internal state for processing subsequent inputs. In certain implementations, an RNN employed by the information extraction server 1010 may utilize long short-term memory (LSTM) units. The term "long short-term" refers to a short-term memory model which can persist for a long period of time. An LSTM unit includes a cell, an input gate, an output gate, and a forget gate. The cell is responsible for storing values over arbitrary time intervals. Each of the three gates can be viewed as an artificial neuron which computes an activation of a weighted sum, thus regulating the flow of values through the connections of the LSTM. Thus, an LSTM-based neural network may be utilized to classify, process, and predict time series having time lags of unknown duration between important events.

In another illustrative example, the information extraction server 1010 may employ rule-based information extraction methods, which may apply a set of production rules to a graph representing syntactic and/or semantic structure of the input text. The production rules may interpret the graph and yield definitions of information objects referenced by tokens of the input text and identify various relationships between the extracted information objects. In an illustrative example, the left-hand side of a rule may include a set of logical expressions defined on one or more templates applied to the graph representing the input text. The template may reference one or more lexical structure elements (e.g., a certain grammeme or semanteme etc.), syntactic structure elements (e.g., a surface or deep slot) and/or semantic structure elements (e.g., an ontology concept). Matching the template defined by the left-hand side of the rule to at least a part of the graph representing the input text triggers the right-hand side of the rule, which associates one or more attributes (e.g., an ontology concept) with an information object referenced by a token of the input text.

As noted herein above, the information extraction server 1010 may process a set of structured communications (e.g., electronic mail messages, instant messages, and/or voicemail transcriptions stored by a corporate messaging server) to identify one or more tasks assigned to an employee whose performance is being evaluated. In order to identify the tasks, the information extraction server 1010 may process both payload (text) and metadata (e.g., the header fields identifying the sender and the addressee of an electronic mail message, the message timestamps, the message priority or importance indicator, etc.). Each input document (e.g., an electronic mail message, an instant message, or a voicemail transcript) may be represented by a vector of features, which are derived from the terms extracted from the document body and/or document metadata. Accordingly, a named entity extraction pipeline may be employed to extract the named entities from To:, Cc:, and/or From: fields of the set of structured communications. In certain implementations, another named entity extraction pipeline may be employed to extract the named entities from the body and/or subject line of the electronic messages. In certain implementations, yet another extraction pipeline may be employed for extracting document timestamps, priority and/or importance indicators, and/or various other metadata. A separate extraction pipelines may analyze the message bodies. Each of the extraction pipelines may utilize the above described trainable classifiers, production rules, neural networks, statistical methods and/or their various combinations.

In an illustrative example, if a task assignment template specified by a production rule matches a graph representing an input document (e.g., an electronic mail message), a task is presumed to be assigned by the message sender to the message addressee. In certain implementations, the information extraction server 1010 may further retrieve the organizational structure data from the directory server 1060, and may only determine that a task has been assigned if the position of the presumed task initiator (i.e., the message sender) has a management authority over the employee to whom the task has been presumably assigned (i.e., the message addressee). In an illustrative example, the information extraction server 1010 may determine that a task described by the body of a message has been assigned to an employee identified by the message metadata if a route satisfying one or more conditions is identified in the graph representing the organizational structure. Evaluating such conditions may include ascertaining that the hierarchical level of the employee to whom the task has been presumably assigned exceeds the hierarchical level of the presumed task initiator (assuming that the levels are sequentially numbered starting from the root vertex of the graph). The hierarchical levels may be retrieved from the directory server 1060. In various alternative implementations, the task assignment may be detected by applying various combinations of statistical methods, trainable classifiers, rule sets and/or neural networks.

In certain implementations, the information extraction server 1010 may, for every task, identify a subset of input documents (e.g., a logical thread of electronic mail messages) associated with the task. In an illustrative example, the logical thread may be identified based on the subject filed, the sender and addressee field, the message timestamps, and/or their various combinations. The information extraction server 1010 may further determine the current completion status of the task, the time taken to complete the task, the task category, importance, and complexity, the level of sentiments expressed by the task initiator with respect to the task progress and results, whether the task has been completed by the due date which has been specified by the task initiator, and/or various other attributes of the task.

In certain implementations, the completion status may be represented by one of "assigned," "in progress," and "completed." An assigned task may be presumed to transition to the "in progress" status upon the message in which the task assignment is detected has been read and/or replied by the employee. In an illustrative example, if a task completion template specified by a production rule matches a graph representing an input document (e.g., an electronic mail message), the task is presumed to be "completed." In various alternative implementations, the task completion may be detected by applying various combinations of statistical methods, trainable classifiers, rule sets and/or neural networks.

In certain implementations, the task category may describe the functional nature of the task (e.g., "attending a planning session," "gathering functional requirements," "generating design," "generating functional specifications," etc.). In an illustrative example, the task category may be determined by a trainable classifier processing the bodies of one or more electronic mail messages of the thread associated with the task. In various alternative implementations, the task completion may be detected by applying various combinations of statistical methods, trainable classifiers, rule sets and/or neural networks.

The task importance may be represented by a numeric value reflecting a relative importance of the task on a pre-defined scale. In an illustrative example, the task importance may be determined by a trainable classifier processing the bodies of one or more electronic mail messages of the thread associated with the task. In various alternative implementations, the task importance may be detected by applying various combinations of statistical methods, trainable classifiers, rule sets and/or neural networks. In certain implementations, if the task importance is not expressly or implicitly specified by the electronic mail messages of the thread associated with the task, the information extraction server 1010 may assign the task importance based on the hierarchical level of the task initiator within the organization, the frequency of communications between the employee and the task initiator, one or more pre-defined rules, and/or various combinations of the above-references criteria.

The task complexity may be represented by a numeric value reflecting an estimated level of effort or time which is necessary to complete the task. In an illustrative example, the task complexity may be determined by a trainable classifier processing the bodies of one or more electronic mail messages of the thread associated with the task. In various alternative implementations, the task complexity may be detected by applying various combinations of statistical methods, trainable classifiers, rule sets and/or neural networks.

The level of sentiments may reflect the sentiments of the task initiator and/or other concerned parties with respect to the progress, completion status, and/or quality of the work product associated with the task. In an illustrative example, the level of sentiments may be represented by a value indicating a "positive," "neutral," or "negative" sentiment; in another illustrative example, the level of sentiments may be represented by a numeric value on a pre-defined scale. In an illustrative example, the level of sentiment may be determined by a trainable classifier processing the bodies of one or more electronic mail messages of the thread associated with the task. In various alternative implementations, the level of sentiment may be detected by applying various combinations of statistical methods, trainable classifiers, rule sets and/or neural networks.

The extracted information may be fed to the performance evaluation server 1040, which may produce the values one or more performance evaluation metrics characterizing the employee performance. In an illustrative example, the performance evaluation server 1040 may compute the number of tasks of a given category, importance, and/or complexity level completed by a given employee within a specified period of time. In certain implementations, the performance evaluation server 1040 may further compute the ratio of the number of tasks of a given category, importance, and/or complexity level which have been completed by the originally set due date to the total number of tasks completed by the employee. In another illustrative example, the performance evaluation server 1040 may compute an aggregate (e.g., average, median, minimal, or maximal) level of sentiments which has been expressed by the task initiators and/or other concerned parties with respect to the employee performance within the specified period of time. In another illustrative example, the performance evaluation server 1040 may compute the ratio of the number of tasks associated with a given (e.g., positive, neutral, or negative) level of sentiments expressed by the task initiator and/or other concerned parties to the total number of tasks completed by the employee. In another illustrative example, the performance evaluation server 1040 may compute, for a given category, importance, and/or complexity level of tasks, an aggregate time period between task assignment and task completion by the employee. In another illustrative example, the performance evaluation server 1040 may compute an aggregate time period between receiving an incoming communication and responding to the incoming communication by the employee. In another illustrative example, the performance evaluation server 1040 may compute the total number of incoming communications to which the employee has responded within the specified period of time.

The performance evaluation server 1040 may, for each employee, produce a vector of performance evaluation metric values, including the above-described and/or other performance indicators characterizing the performance of the employee within the specified period of time. In certain implementations, the performance evaluation server 1040 may further produce, for each employee, a value of a synthetic performance evaluation metric, which may be produced by applying a pre-defined transformation (e.g., a weighted sum) to the above-described and/or other performance indicators characterizing the performance of the employee within the specified period of time.

In certain implementations, the performance evaluation server 1040 may assign, to the employee whose performance being evaluated, a category characterizing the overall performance level of the employee in comparison with other employees within the organization and/or organizational unit. Examples of such categories include: winners (e.g., a pre-defined share of the employee population who have demonstrated the highest performance metric values and the highest level of sentiments), rising stars, best performers (e.g., a pre-defined share of the employee population who have demonstrated the highest performance metric values), worst performers (e.g., a pre-defined share of the employee population who have demonstrated the lowest performance metric values), the least engaged (e.g., employees who have demonstrated the worst communication response times), the most engaged (e.g., employees who have demonstrated the best communication response times), the fastest (e.g., employees who have demonstrated the best task completion times), the slowest (e.g., employees who have demonstrated the worst task completion times), etc.

Upon computing the performance evaluation metric values, the performance evaluation server 1040 may compare the computed metric values with various aggregate metric values (e.g., aggregate performance metric of the organizational unit to which the employee is assigned). Additionally, or alternatively, the performance evaluation server 1040 may compare the computed metric values with various historic metric values characterizing the performance of the same employee within one or more periods of time preceding the current period of time. Responsive to determining a significant deviation of the computed performance evaluation metric values from the stored aggregate metric values and/or historic metric values, the performance evaluation server may generate an alert (e.g., an electronic mail message and/or instance message) to a supervisor of the employee whose performance is being evaluated, thus prompting the supervisor to reward the employee or take appropriate corrective actions.

The computed performance metric values may be fed to the presentation server 1070, which may generate various reports to be presented via a graphical user interface to one or more users of client computers 1080.

It should be noted that the functional designations of the servers shown in FIG. 10 are for illustrative purposes only; in various alternative implementations, one or more functional components may be collocated on a single physical server and/or a single functional component may be implemented by two or more physical servers. Furthermore, various network infrastructure components, such as firewalls, load balancers, network switches, etc., may be omitted from FIG. 10 for clarity and conciseness. Computer systems, servers, clients, appliances, and network segments are shown in FIG. 10 for illustrative purposes only and do not in any way limit the scope of the present disclosure. Various other computer systems, servers, clients, infrastructure components, appliances, and/or methods of their interconnection may be compatible with the methods and systems described herein.

Thus, the systems and methods described herein may be utilized for evaluating individual employee performance and for comparing aggregate performance levels demonstrated by different organizational units within a single organization, in order to identify best and worst individual performers and teams and/or manage the workload assignment to individual performers and teams.

Figure 11:
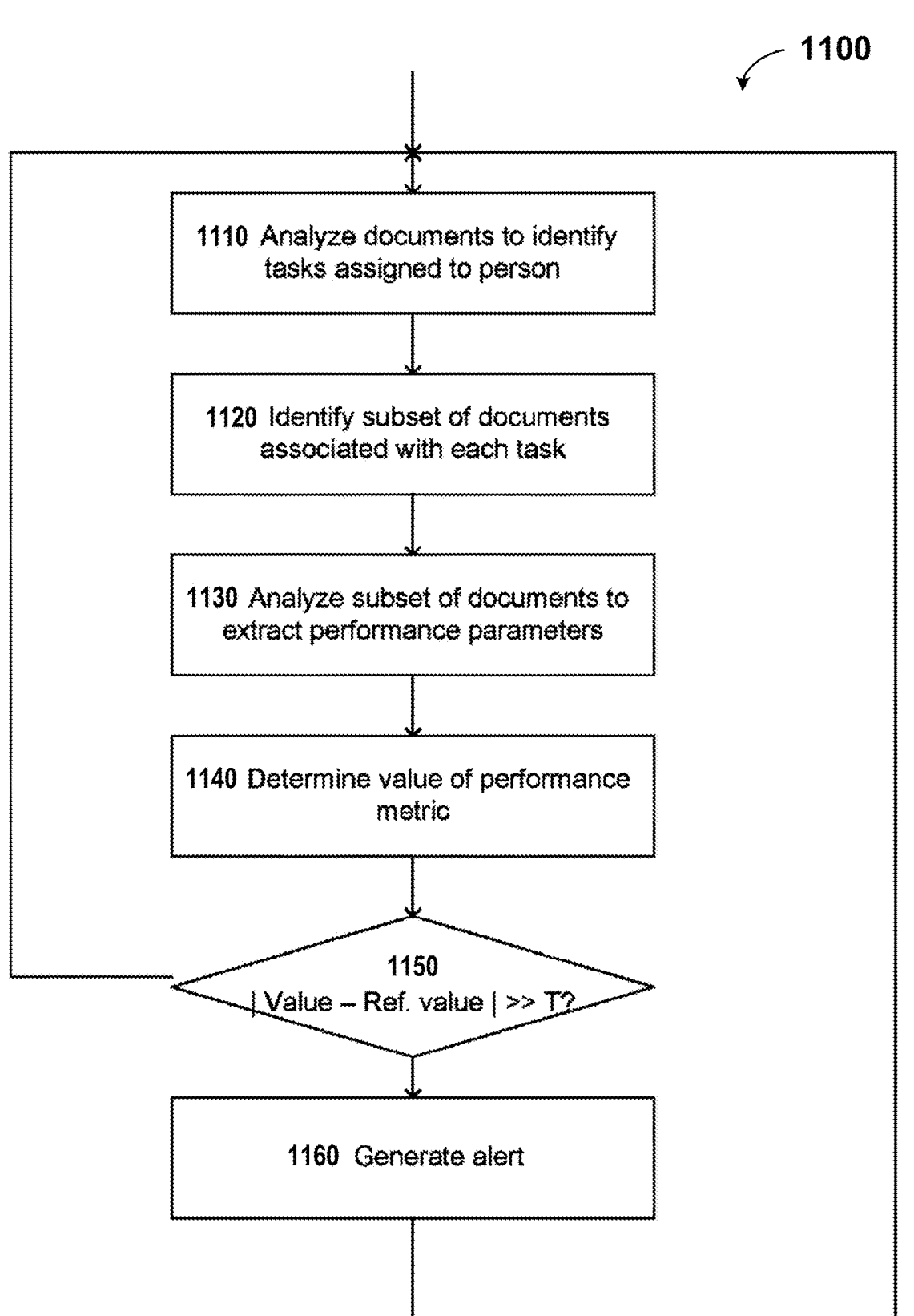
FIG. 11 depicts a flow diagram of an example method of performance evaluation based on processing structured communications, in accordance with one or more aspects of the present disclosure.

FIG. 11 depicts a flow diagram of an example method 1100 of performance evaluation based on processing structured communications, in accordance with one or more aspects of the present disclosure. Method 1100 and/or each of its individual functions, routines, subroutines, or operations may be performed by one or more processors of the computer system (e.g., the information extraction server 1010 and/or performance evaluation server 1040 of FIG. 10) implementing the method. In certain implementations, method 1100 may be performed by a single processing thread. Alternatively, method 1100 may be performed by two or more processing threads, each thread executing one or more individual functions, routines, subroutines, or operations of the method. In an illustrative example, the processing threads implementing method 1100 may be synchronized (e.g., using semaphores, critical sections, and/or other thread synchronization mechanisms). Alternatively, the processing threads implementing method 1100 may be executed asynchronously with respect to each other.

At block 1110, the computer system implementing the method may process a plurality of documents which record communications of a person to identify one or more tasks assigned to the person. In various illustrative examples, the plurality of documents may include electronic mail messages, instant messages, and/or voicemail transcriptions, as described in more detail herein above.

At block 1120, the computer system may identify a subset of documents associated with each of the identified tasks. In an illustrative example, the subset of documents may be represented by a logical thread of electronic mail messages, which may be identified based on the subject filed, the sender and addressee field, the message timestamps, and/or their various combinations, as described in more detail herein above.

At block 1130, the computer system may analyze the subset of documents to extract various performance parameters characterizing performance of the person. In various illustrative examples, the performance parameters may include: the completion status of each task; the level of sentiments associated each task; the number of tasks of a given category, importance, and/or complexity level completed by the person within a specified period of time; the ratio of the number of tasks of a given category, importance, and/or complexity level which have been completed by the originally set due date to the total number of tasks completed by the person; the ratio of the number of tasks associated with a given (e.g., positive, neutral, or negative) level of sentiments expressed by the task initiator and/or other concerned parties to the total number of tasks completed by the person; an aggregate time period between task assignment and task completion by the person for a given category, importance, and/or complexity level of tasks; an aggregate time period between receiving an incoming communication and responding to the incoming communication by the person; and/or the total number of incoming communications to which the person has responded within the specified period of time, as described in more detail herein above.

At block 1140, the computer system may determine a value of a performance metric associated with the person. The performance metric value may reflect the extracted performance parameters characterizing the performance of the person within the specified period of time. In an illustrative example, the performance metric may be represented by a vector of the above-described performance evaluation metric values. In another illustrative example, a synthetic performance evaluation metric may be produced by applying a pre-defined transformation (e.g., a weighted sum) to the above-described performance evaluation metric values, as described in more detail herein above.

Responsive to determining, at block 1150, that the difference between the computed value of the performance metric and a reference performance metric value exceeds a pre-defined threshold, the computer system may, at block 1160, generate an alert which references the value of the performance metric. In various illustrative examples, the reference performance metric value may be represented by an aggregate value of the performance metric associated with the organizational unit of the person or a historic value of the performance metric characterizing performance of the person in one or more time periods preceding the current time periods. The alert may be represented by an electronic mail message and/or instant message addresses to a supervisor of the person whose performance is being evaluated, as described in more detail herein above.

What is claimed is:

1. A method of document cluster labeling, the method comprising:

selecting, by a processing device, a current document cluster of a plurality of document clusters, wherein the current document cluster includes documents organized according to a predefined algorithm based on respective distances between vectorized representations of the respective documents within the current document cluster;

based on a vector representing the current document cluster, identifying a sorted list of terms associated with the current document cluster, wherein respective terms of the sorted list of terms are weighted according to a Term Frequency-Inverse Document Frequency (TF-IDF) weighting scheme;

initializing a label associated with the current document cluster;

automatically selecting a first term from the list of terms comprised by the documents of the document cluster, based on respective weightings of the terms according to the term frequency-inverse document frequency (TF-IDF) weighting scheme;

automatically appending the term to the label associated with the current document cluster;

responsive to determining that the label is found in a label dictionary, (i) iteratively selecting one or more next terms from the list of terms comprised by the document cluster based on the respective weightings of the terms according to the TF-IDF weighting scheme and (ii) automatically appending each of the next terms to the label associated with the current document cluster;

responsive to failing to locate the label in the label dictionary, inserting the label into the label dictionary; and associating the label with the current document cluster.

2. The method of claim 1, further comprising sorting the plurality of document clusters by a number of documents comprised by a respective document cluster.

3. The method of claim 1, further comprising sorting the list of terms by a respective term weight.

4. The method of claim 1, further comprising excluding, from the list of terms, a term comprising at least part of an entity name.

5. The method of claim 1, further comprising visually representing, via a graphical user interface, one or more clusters of the plurality of document clusters in a visual association with respective labels.

6. The method of claim 1, wherein the plurality of document clusters comprises a plurality of electronic mail messages.

7. The method of claim 1, wherein the plurality of document clusters comprises a plurality of documents represented by respective vectors in a hyperspace of document features.

8. A system, comprising:

a memory; and a processor coupled to the memory, wherein the processor is configured to:

select a current document cluster of a plurality of document clusters, wherein the current document cluster includes documents organized according to a predefined algorithm based on respective distances between vectorized representations of the respective documents within the current document cluster;

based on a vector representing the current document cluster, identify a sorted list of terms associated with the current document cluster, wherein respective terms of the sorted list of terms are weighted according to a Term Frequency-Inverse Document Frequency (TF-IDF) weighting scheme;

initialize a label associated with the current document cluster;

automatically select a first term from the list of terms comprised by the documents of the document cluster, based on respective weightings of the terms according to the term frequency-inverse document frequency (TF-IDF) weighting scheme;

automatically append the term to the label associated with the current document cluster;

responsive to determining that the label is found in a label dictionary, (i) iteratively select one or more next terms from the list of terms comprised by the document cluster based on the respective weightings of the terms according to the TF-IDF weighting scheme and (ii) automatically append each of the next terms to the label associated with the current document cluster;

responsive to failing to locate the label in the label dictionary, insert the label into the label dictionary; and associate the label with the current document cluster.

9. The system of claim 8, wherein the processor is further configured to sort the plurality of document clusters by a number of documents comprised by a respective document cluster.

10. The system of claim 8, wherein the processor is further configured to sort the list of terms by a respective term weight.

11. The system of claim 8, wherein the processor is further configured to exclude, from the list of terms, a term comprising at least part of an entity name.

12. The system of claim 8, wherein the processor is further configured to visually represent, via a graphical user interface, one or more clusters of the plurality of document clusters in a visual association with respective labels.

13. The system of claim 8, wherein the plurality of document clusters comprises a plurality of electronic mail messages.

14. The system of claim 8, wherein the plurality of document clusters comprises a plurality of documents represented by respective vectors in a hyperspace of document features.

15. A non-transitory, computer-readable storage medium comprising executable instructions that, when executed by a computer system, cause the computer system to:

select a current document cluster of a plurality of document clusters, wherein the current document cluster includes documents organized according to a predefined algorithm based on respective distances between vectorized representations of the respective documents within the current document cluster;

based on a vector representing the current document cluster, identify a sorted list of terms associated with the current document cluster, wherein respective terms of the sorted list of terms are weighted according to a Term Frequency-Inverse Document Frequency (TF-IDF) weighting scheme;

initialize a label associated with the current document cluster;

automatically select a first term from the list of terms comprised by the documents of the document cluster, based on respective weightings of the terms according to the term frequency-inverse document frequency (TF-IDF) weighting scheme;

automatically append the term to the label associated with the current document cluster;

responsive to determining that the label is found in a label dictionary, (i) iteratively select one or more next terms from the list of terms comprised by the document cluster based on the respective weightings of the terms according to the TF-IDF weighting scheme and (ii) automatically append each of the next terms to the label associated with the current document cluster;

responsive to failing to locate the label in the label dictionary, insert the label into the label dictionary; and associate the label with the current document cluster.

16. The non-transitory, computer-readable storage medium of claim 15, further comprising executable instructions that, when executed by the computer system, cause the computer system to sort the plurality of document clusters by a number of documents comprised by a respective document cluster.

17. The non-transitory, computer-readable storage medium of claim 15, further comprising executable instructions that, when executed by the computer system, cause the computer system to sort the list of terms by a respective term weight.

18. The non-transitory, computer-readable storage medium of claim 15, further comprising executable instructions that, when executed by the computer system, cause the computer system to exclude, from the list of terms, a term comprising at least part of an entity name.

19. The non-transitory, computer-readable storage medium of claim 15, further comprising executable instructions that, when executed by the computer system, cause the computer system to visually represent, via a graphical user interface, one or more clusters of the plurality of document clusters in a visual association with respective labels.

20. The non-transitory, computer-readable storage medium of claim 15, wherein the plurality of document clusters comprises a plurality of electronic mail messages.

21. The method of claim 1, wherein:

the current document cluster is grouped based on a generating vectors for each respective document of the current document cluster including (i) a time-sensitive factor and (ii) a content-sensitive factor, and the weighting of the terms according to the TF-IDF weighting scheme is based on the content-sensitive factor.

22. The method of claim 1, wherein:

the predefined algorithm comprises a DBSCAN algorithm such that (i) each document within the current document cluster satisfies a nearby-neighbor threshold and (ii) each document within the current document cluster is connected to each other document within the current document cluster via a path that is contained completely within the current document cluster and that passes through a core of the current document cluster; or the predefined algorithm comprises an OPTICS algorithm such that each document within the current document cluster is linearly ordered with respect to each other document within the current document cluster based on a spatial distance between each of the documents within the current document cluster.

* * * * *